(12) United States Patent
Matsuo et al.

(10) Patent No.: US 7,313,142 B2
(45) Date of Patent: Dec. 25, 2007

(54) PACKET PROCESSING DEVICE

(75) Inventors: Akira Matsuo, Kawasaki (JP);
Norihisa Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 994 days.

(21) Appl. No.: 10/347,392

(22) Filed: Jan. 21, 2003

(65) Prior Publication Data
US 2003/0227925 A1    Dec. 11, 2003

(30) Foreign Application Priority Data
Jun. 7, 2002    (JP)    ............... 2002-167753

(51) Int. Cl.
H04L 12/28    (2006.01)
H04L 12/56    (2006.01)
H04L 12/54    (2006.01)

(52) U.S. Cl. ................... 370/395.32; 370/429
(58) Field of Classification Search ........... 370/395.32, 370/429
See application file for complete search history.

(56) References Cited

U.S. PATENT DOCUMENTS

| | | | |
|---|---|---|---|
| 6,839,346 B1 * | 1/2005 | Kametani | 370/389 |
| 6,944,168 B2 * | 9/2005 | Paatela et al. | 370/401 |
| 6,985,964 B1 * | 1/2006 | Petersen et al. | 709/244 |
| 7,039,013 B2 * | 5/2006 | Ruutu et al. | 370/235 |
| 2002/0131413 A1 * | 9/2002 | Tsao et al. | 370/392 |
| 2003/0012198 A1 * | 1/2003 | Kaganoi et al. | 370/392 |
| 2003/0231634 A1 * | 12/2003 | Henderson et al. | 370/395.32 |
| 2005/0175005 A1 * | 8/2005 | Brown | 370/389 |

FOREIGN PATENT DOCUMENTS

| | | |
|---|---|---|
| JP | 07-200496 | 8/1995 |
| JP | 07-212365 | 8/1995 |
| JP | 11-317783 | 11/1999 |
| JP | 2001-236221 | 8/2001 |

OTHER PUBLICATIONS

Office Action by the Japanese Patent Office dated Apr. 5, 2005 for the corresponding Japanese Patent Application No. 2002-167753.

* cited by examiner

Primary Examiner—Kwang Bin Yao
Assistant Examiner—Ju-Tai Kao
(74) Attorney, Agent, or Firm—Staas & Halsey LLP

(57) ABSTRACT

A packet processing device has a search engine module including an associative memory for transferring a packet on the basis of an entry mapping to route information, a first processor taking charge of a pre-search process before a process of the packet to the search engine module, and a second processor taking charge of a post-search process for executing a process of routing the packet on the basis of a search result of the search engine module. In this architecture, the packet processing device further has a table used for transferring and receiving information between the first processor in charge of the pre-search process and the second processor in charge of the post-search processor, and identifying information in a specified field of the table is transferred through the search engine module as a transparent medium.

7 Claims, 18 Drawing Sheets

1 IP PACKET PROCESSING DEVICE

SET WEIGHT VALUES OF EACH QoS TO 8:4:2:1
PACKETS HAVING 5-CELL LENGTH, 4-CELL LENGTH AND 3-CELL LENGTH ARE BUFFERED IN BUFFER OF EACH QoS.

QoS WHEEL (at various time points up to POINT A):

| | QoS #1 | QoS #2 | #3 | #4 |
|---|---|---|---|---|
| QoS #1 CREDIT VALUE | 8 | -1-1-1-1 7 | ... | ... |
| QoS #2 CREDIT VALUE | 4 | +1+1+1 5 | ... | ... |
| QoS #3 CREDIT VALUE | 2 | +1+1 2 | ... | ... |
| QoS #4 CREDIT VALUE | 1 | +1 1 | ... | ... |

READOUT PACKET: 5-CELL LENGTH, 4-CELL LENGTH, 3-CELL LENGTH

WHEN READING NEW PACKET, IT IS SELECTED FROM QoS WITH MAXIMUM CREDIT VALUE.
IF SELF-QoS TIME IS SENT TO OTHER QoS, CREDIT VALUE IS INCREMENTED BY 1,
AND IF READ OUT IN OTHER QoS TIME, CREDIT VALUE IS DECREMENTED BY 1.

RATIO AT POINT A IS AS FOLLOWS
 QoS#1: READOUT PACKET (29) + PRESENT CREDIT VALUE (4) = 33 CREDITS
 QoS#2: READOUT PACKET (11) + PRESENT CREDIT VALUE (4) = 15 CREDITS
 QoS#3: READOUT PACKET (5) + PRESENT CREDIT VALUE (3) = 8 CREDITS
 QoS#4: READOUT PACKET (3) + PRESENT CREDIT VALUE (4) = 4 CREDITS
RATIO IS GIVEN SUCH AS 33:15:8:4 ≒ 8:4:2:1

OPERATIONS WHEN READING PACKET IN FIGURE

POINT α
(1) WHEN READING NEW PACKET, PACKET OF QoS HAVING MAXIMUM CREDIT VALUE AT THIS POINT OF TIME (POINT α), NAMELY QoS#2 IS SELECTED.
(2) QoS INDICATED BY PRESENT QoS WHEEL IS QoS#2, AND READOUT PACKET IS QoS#2, AND HENCE NONE OF QoS CREDIT VALUES IS UPDATED.

POINT α+1
(1) PACKET READ OUT HAS 4-CELL LENGTH, AND THEREFORE QoS#2 PACKET IS CONSECUTIVELY READ.
(2) QoS INDICATED BY PRESENT QoS WHEEL IS QoS#3, AND READOUT PACKET IS QoS#2. HENCE QoS#2 CREDIT VALUE IS DECREMENTED BY 1,
WHILE QoS#3 CREDIT VALUE IS INCREMENTED BY 1.

POINT α+2
(1) PACKET READ OUT HAS 4-CELL LENGTH, AND THEREFORE QoS#2 PACKET IS CONSECUTIVELY READ.
(2) QoS INDICATED BY PRESENT QoS WHEEL IS QoS#3, AND READOUT PACKET IS QoS#2. HENCE QoS#2 CREDIT VALUE IS DECREMENTED BY 1,
WHILE QoS#3 CREDIT VALUE IS INCREMENTED BY 1.

POINT α+3
(1) PACKET READ OUT HAS 4-CELL LENGTH, AND THEREFORE QoS#2 PACKET IS CONSECUTIVELY READ.
(2) QoS INDICATED BY PRESENT QoS WHEEL IS QoS#4, AND READOUT PACKET IS QoS#2. HENCE QoS#2 CREDIT VALUE IS DECREMENTED BY 1,
WHILE QoS#4 CREDIT VALUE IS INCREMENTED BY 1.

POINT α+4
(1) CREDIT VALUES OF EACH QoS ARE UPDATED, AND PACKET READ OUT NEXT IS QoS#3 HAVING MAXIMUM CREDIT VALUE.

PACKET PROCESSING DEVICE

BACKGROUND OF THE INVENTION

The present invention relates generally to a packet processing device, and more particularly to an IP packet processing device constructed of a multi-engine type or multi-task type packet processing engine module, and a search engine.

Over the recent years, there has been a sharp increase in use of an IP network in a form of being applied to the Internet and an intranet (enterprise network), wherein an IP (Internet Protocol) protocol is utilized as a network layer protocol. What is demanded with this increase is an enhancement of performance of the IP packet processing device such as a router for executing a routing process of an IP packet (which might simply be termed a packet unless specified otherwise) in the IP network.

Further, with an introduction and an extension of the IP network, mainly an IP traffic occupies data communications. An IP packet is, however, defined as variable-length IP datagram, and a problem is therefore how a quality of service (QoS) is guaranteed with respect to a deficiency of throughput for a burst traffic of short packets, an influence upon other packets when reading long packets and so on.

Generally, the IP packet processing device includes a packet processing engine module for executing a packet process and a search engine module for executing a search process in a packet routing process. In this IP packet processing device, when executing the routing process of the packet, the search process is implemented based on a destination address contained in a header field of the inputted packet, and a destination (a MAC address etc) is determined from information obtained, thereby forwarding the packet.

As elements differentiating a product, additions of various categories of service functions and an increase in accommodation factor for a product cost, are further demanded of the IP packet processing device in a network-sided system. Moreover, for responding to a request for further improving the packet routing throughput, a scheme is becoming a mainstream that the packet processing engine module takes an architecture in which network processors (NPs) having a plurality of built-in engines (multi engines) execute a distributed process at a high speed, and that the search engine module uses a large-capacity CAM (Content Addressable Memory) capable of processing a multi-bits high-speed search.

The additions of the new functions required of the IP packet processing device show an increasing trend, and a throughput of the packet processing is as high as 2.4 Gbps or 10 Gbps, wherein a throughput even a high-speed operating network processor can not reach those levels.

Further, the search process required of the search engine module is increasingly diversified into a routing (route information) search, a filtering search, a classifying search and so forth, with the result that a search process time is not ignored even when using the high-speed CAM.

SUMMARY OF THE INVENTION

It is a primary object of the present invention to provide a technique capable of improving a throughput by largely restraining a time of waiting for a search process.

It is another object of the present invention to provide a technique capable of smoothly transferring and receiving information between a processor in charge of (assigned) a pre-search process and a processor in charge of (assigned) a post-search process.

It is still another object of the present invention to provide a technique capable of guaranteeing a QoS (Quality of Service) without a deficiency of throughput even in an extreme burst traffic.

It is a further object of the present invention to provide a technique capable of unitarily managing routing statistics and queuing statistics.

To accomplish these objects, a first packet processing device of the present invention has a search engine module including an associative memory for transferring a packet on the basis of an entry mapping to route information, a first processor taking charge of a pre-search process before a process of the packet to the search engine module, and a second processor taking charge of a post-search process for executing a process of routing the packet on the basis of a search result of the search engine module.

In this architecture, the packet processing device further has a table used for transferring and receiving information between the first processor in charge of the pre-search process and the second processor in charge of the post-search processor, wherein identifying information in a specified field of the table is transferred through the search engine module as a transparent medium.

Further, the packet processing device further has a module monitoring, if the table is constructed of a FIFO memory, a queue length of the FIFO memory, and dynamically changing a share number of the first processors in charge of the pre-search process and a share number of the second processors in charge of the post-search process in accordance with how much a queue stays.

Moreover, the search engine module includes, separately from an interface for a search request from the first processor in charge of the pre-search process, a statistics request interface in order to make a unitary management of queuing statistics information from at least the first processor in charge of the pre-search process and the second processor in charge of the post-search process together with routing statistic information.

A second packet processing device of the present invention further has a descriptor registered with all pieces of queuing information as one cluster for every destination in order to transfer and receive the information between a queuing process of writing the information in a queue for every flow and a scheduling process of reading the information from the queue.

A third packet processing device of the present invention further has a two-stage queue structure module containing a plurality of classes existing in each flow and a plurality of subclasses further existing in one class.

In this architecture, a packet having a high priority in a complete priority readout is read with a top priority from the first-stage class in the two-stage queue structure module, credit values as readout ratios are set in the plurality of subclasses at the second stage, and the packet is read corresponding to this credit value.

Moreover, the packet processing device further has a reading algorithm used for mutually lending and borrowing the credit values when the reading between the plurality of subclasses is effected corresponding to the readout ratio specified in each subclass.

A fourth packet processing device of the present invention has a module indicating at least one location for storing a destination address contained in a received packet and information related to a process of this packet, a module setting a mapping of the storage location to information specifying a packet output destination obtained by searching for route information on the basis of the destination address stored in the location, and a module executing a necessary process of the packet on the basis of information related to the packet process, the information being obtained from the storage location, and sending the packet to the output destination specified.

A fifth packet processing device of the present invention has a module indicating a destination address contained in a packet received, and at least one location stored with information related to a process of this packet, a module setting a mapping of the storage location to information specifying a packet output destination obtained by searching for route information on the basis of the destination address, and a module executing a necessary process of the packet on the basis of information related to the packet process, the information being obtained from the storage location, and sending the packet to the output destination specified.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 10 is an explanatory diagram showing a throughput of the IP packet processing device in FIG. 2;

FIG. 18 is an explanatory diagram showing a ratio reading algorithm in the IP packet processing device in the fourth embodiment.

DETAILED DESCRIPTION OF THE PREFERRED EMBODIMENTS

Next, embodiments of the present invention will hereinafter be described with reference to the accompanying drawings.

Basic Architecture of IP Packet Processing Device

Figure 1:
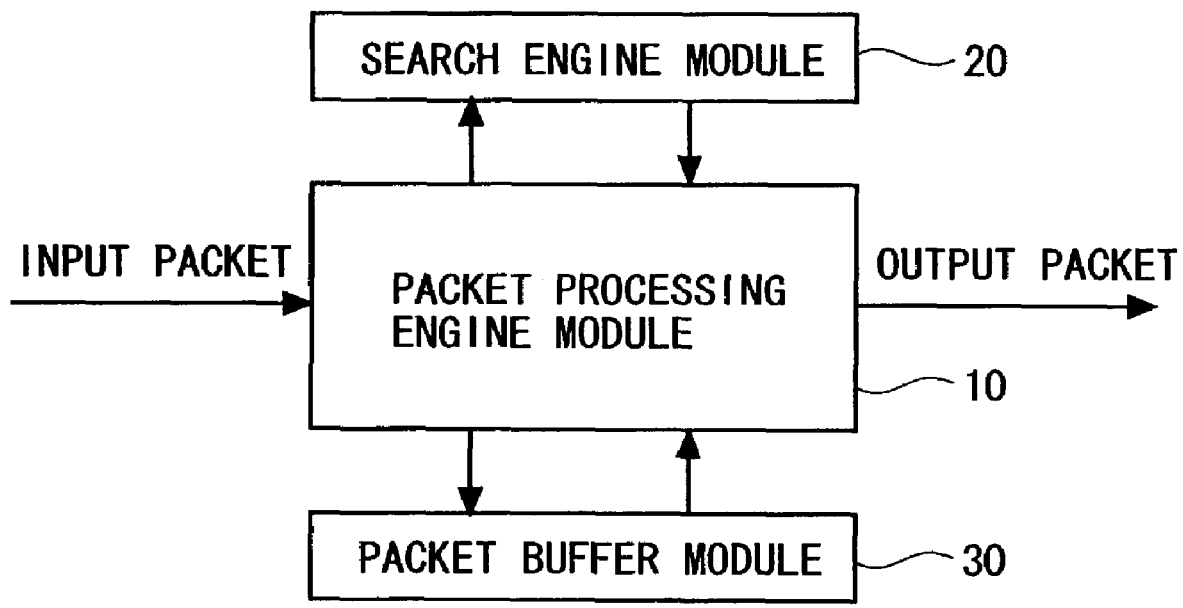
FIG. 1 is a block diagram showing a common architecture of an IP packet processing device in each embodiment of the present invention.

FIG. 1 shows a basic architecture of an IP packet processing device of the present invention. Referring to FIG. 1, this IP packet processing device 1 includes a packet processing engine module 10, a search engine module 20 and a packet buffer module 30.

The IP packet processing device 1 can be applied to a router for forwarding an IP packet on the basis of an entry mapping to routing information in an IP network in which communications are performed based on an IP protocol.

The IP packet processing device 1 routes the packet between different subnets such as from a certain LAN (Local Area Network) to a different LAN or a leased line within the IP network, and enables the communications between communication nodes incapable of directly transferring and receiving the packet.

The IP packet processing device 1 has a plurality of interfaces and judges whether the IP packet received from a certain interface can be delivered to a destination by deciding, based on a destination address registered in a header field, which interface the packet is forwarded from and where the packet is forwarded to, thus routing the IP packet.

The IP packet processing device 1 normally has a routing table (not shown) stored with information indicating where the packet should be routed based on the destination address contained in the packet, which is needed for routing the packet.

As will be explained in detail later on, the packet processing engine module 10 of the IP packet processing device 1 includes a plurality of processors serving as multi-engines for executing a sharing process in the packet routing process or as packet processing engines (PEs) for multi-tasks.

Further, the search engine module 20 has a search memory containing a CAM (Content-Addressable Memory) defined as an associative memory in order to enable a high-speed searing process in the packet routing process.

The packet buffer module 30 has a buffer memory (queue) for caching packet data contained in a data field subsequent to the header field of the input packet and transmitting the stored packet data in response to readout control.

The packet processing engine module 10 of the IP packet processing device 1 adopts such an architecture that the packet process is divided into a pre-search process before being transferred to the search engine module 20 and a post-search process executed based on a result of the search by the search engine module 20, and these pre- and post-search processes are processed by different packet processing engines, i.e., by different processors. This architecture enables a queuing time for the search process to be considerably reduced, with the result that an increase in throughput can be expected.

Further, an architecture of the packet processing engine module 10 is that this engine module 10 is provided with an information transfer/receipt table as a shared table for transferring and receiving the information between the processor in charge of (given assignment of) the pre-search process and the processor in charge of (given assignment of) the post-search process, and a piece of identifying information (an index value or a table address etc) in a specified field of this table is transferred via the search engine module 20 defined as a transparent medium. With this architecture, the data can be smoothly transferred and received between the different processors.

Moreover, the information transfer/receipt table in the packet processing engine module 10 is constructed of a FIFO (First-In First-Out) memory. A task manager that controls processing sharing between the plurality of processors as the packet processing engines, monitors a FIFO queue length, and can dynamically change a number of the processing-sharing processors in charge of the pre-search process and a number of those in charge of the post-search process in accordance with how much the congestion is. This configuration does not bring about a deficiency of the throughput even in an extreme burst traffic and enables a QoS (Quality of Service) to be ensured.

On the other hand, the search engine module 20 has a function of making the identifying information in the specified field of the information transfer/receipt table transparent (unaltered) as a piece of hand-over information for transferring and receiving the information between the processor in charge of the pre-search process and the processor in charge if the post-search process.

Further, the architecture taken here is that the search engine module 20 is provided with a statistics request interface different from the search request interface, and statistics on the queuing information from the packet processing engine module 10 are gathered. Routing statistics and queuing statistics are thereby gathered unitarily on one single table and can thus be managed.

The post-search process of the packet processing in the packet processing engine module 10 is subdivided into a writing process (queuing process) to the queue for every flow and a reading process (scheduling process) from the queue. An information transfer/receipt table used for transferring and receiving the information between these queuing and scheduling processes is formed based on a descriptor structure in which all pieces of information are registered in cluster for every destination. This table structure makes it possible to reduce both of an information readout time and an updating process.

Moreover, there is taken a two-stage structure, wherein a plurality of classes exist in each flow, and each class further contains a plurality of subclasses. The first-stage class is set for reading in an absolute priority, in which the packet having a high priority is read in a top priority. Readout ratios (credit initial values) are set in the plurality of second-stage classes, and the packet is read according to the ratio thereof. An algorithm is actualized by lending and borrowing on a credit basis, whereby a packet belonging to a class having the largest credit is read.

Therefore, if the credit value is still large even immediately after reading one packet, the packets can be read consecutively. Further, the credit needs updating only when reading the packet, and hence an impartiality can be assured by a comparatively easy process.

FISRT EMBODIMENT

<IP Packet Processing Device>

Figure 2:
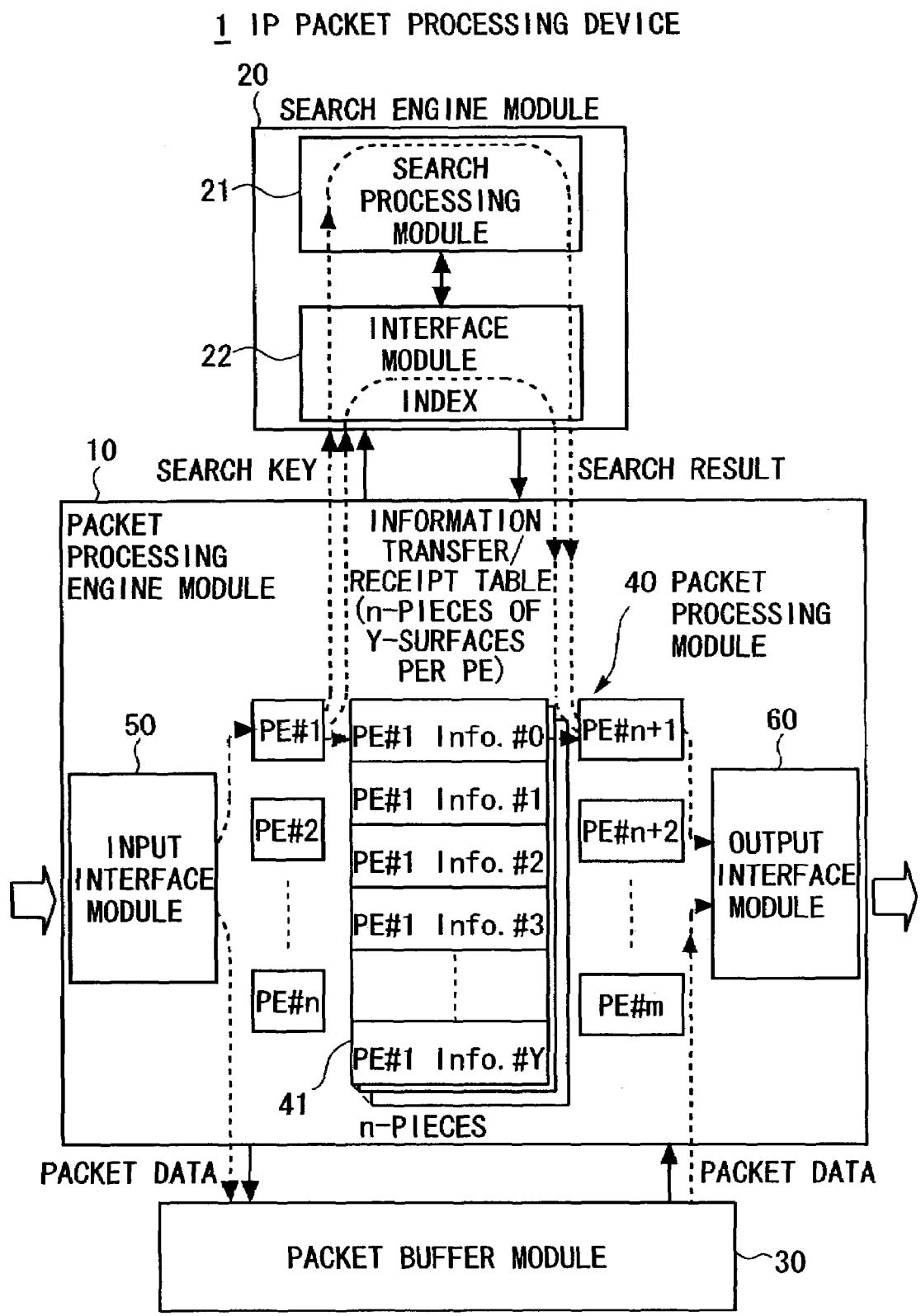
FIG. 2 is a block diagram showing an architecture of the IP packet processing device in a first embodiment of the present invention.

FIG. 2 illustrates an architecture of the IP packet processing device in a first embodiment of the present invention. Referring to FIG. 2, the IP packet processing device 1 includes the packet processing engine module 10, the search engine module 20 and the packet buffer module 30.

The packet processing engine module in the IP packet processing device 1 includes the plurality of processors PS (PE#1 through PE#m) as the multi-engines for executing the sharing process in the packet routing process or as the packet processing engines for the multi-tasks. The plurality of processors PE#1 through PE#m configure the packet processing module 40.

In this packet processing module 40, the packet process is divided into the pre-search process before being transferred to the search engine module 20 and the post-search process executed based on the result of the search by the search engine module 20, and these pre- and post-search processes are processed by the different processors PE.

The packet processing module 40 further includes an information transfer/receipt table 41. This information transfer/receipt table 41 functions as a shared table for transferring and receiving the information between the processors PE#1 through PE#n in charge of the pre-search process and the processors PE#n+1 through PE#M in charge of the post-search process.

There exist the same number of information transfer/receipt tables 41 (n-pieces of tables 41 are provided herein) as the number of the processors PE#1 through PE#n in charge of the pre-search process. Pieces of identifying information (which are the index values or the table addresses etc) in the specified fields of the information transfer/receipt tables 41 are transferred to the processors PE#n+1 through PE#m in charge of the post-search process via the interface module, as the transparent medium, of the search engine module 20. This information transfer/receipt table 41 will be described in greater detail later on with reference to FIG. 5.

The packet processing engine module 10 further includes an input interface module 50 and an output interface module 60.

Moreover, the search engine module 20 has, for enabling a high-speed search process in the packet routing process, a search processing module 21 including the CAM and a search memory containing a radish tree or table, and an interface module 22.

The packet buffer module 30 has a buffer memory (queue) for caching the packet data in the data field subsequent to the header field of the input packet and sending the packet data stored therein in response to the readout control. A structure of this buffer memory will be explained in depth later on in the discussion on a fourth embodiment.

The input packet to the IP packet processing device 1 is received by the input interface module 50 of the packet processing engine module 10. One processor PE (PE#1 is herein assigned) among the processors PE#1 through PE#n in charge of the pre-search process which are in their processing standby status, starts executing the packet routing process of the input packet received by the input interface module 50.

In the packet routing process by the processor PE#1, the packet data are transferred to the packet buffer module 30 from the input interface module 50. Simultaneously with this transfer, the processor PE#1 hunts (captures) a single unused field (which is herein a filed Info.#0) of the selfcorresponding information transfer/receipt table 41, and writes therein only information needed for the post-search process and information (such as a destination address and a data storage head address serving as a search key) necessary for the search process.

The processor PE#1 extracts the information necessary for the post-search process out of the information written in the field Info.#0 and edits the extracted information. Then, the processor PE#1 transfers (sends) together the index value (which is herein Info.#0) and a self-processor (PE) number (which is herein PE#1) in the information transfer/receipt table 41 to the search engine module 20. The processing by the processor PE#1 in charge of the pre-search process is thereby finished.

The search processing module 21 of the search engine module 20 executes a search process on the basis of a search key received from the processor PE#1. The index value and the PE number sent from the processor PE#1 are returned unaltered (transparency) via the interface module 22 and are, waiting for a result of the search by the search processing module 21, transferred to the packet processing module 40.

The search result returned from the search engine module 20 is received by one processor (that is herein PE#n+1) in the processing standby status among the processors PE#n+1 through PE#m in charge of the post-search process.

The processor PE#n+1, based on the index value (Info.#0) and the PE number (PE#1) returned from the interface module 22, accesses the information transfer/receipt table 41 and acquires input information, thereby carrying out the routing process of this packet in a way that takes into account the information on the search result given from the search processing module 21.

<Input Interface Module and Processor in Charge of Pre-Search Process>

Figure 3:
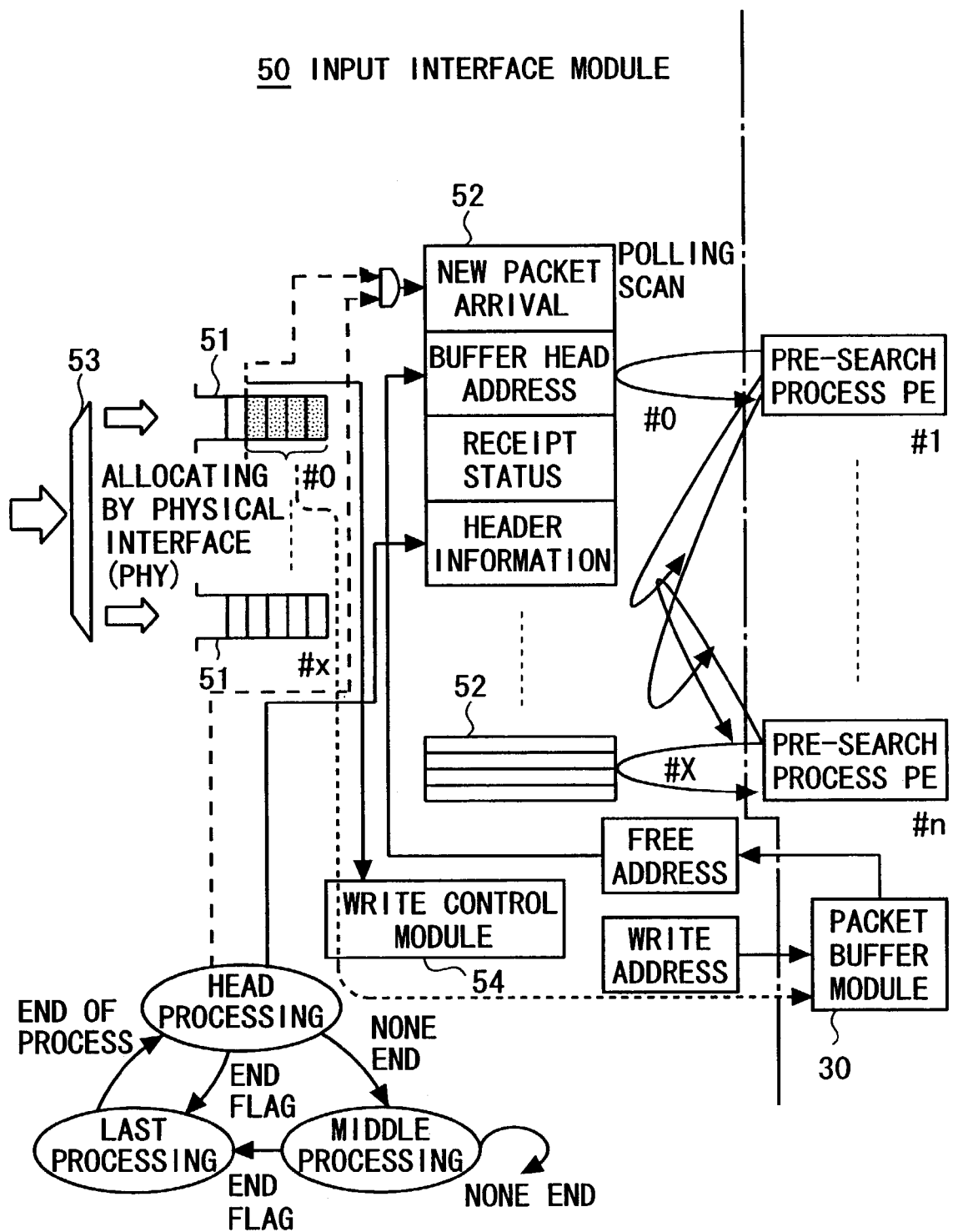
FIG. 3 is a block diagram showing an example of a detailed architecture of an input interface module in FIG. 2.
Figure 4:
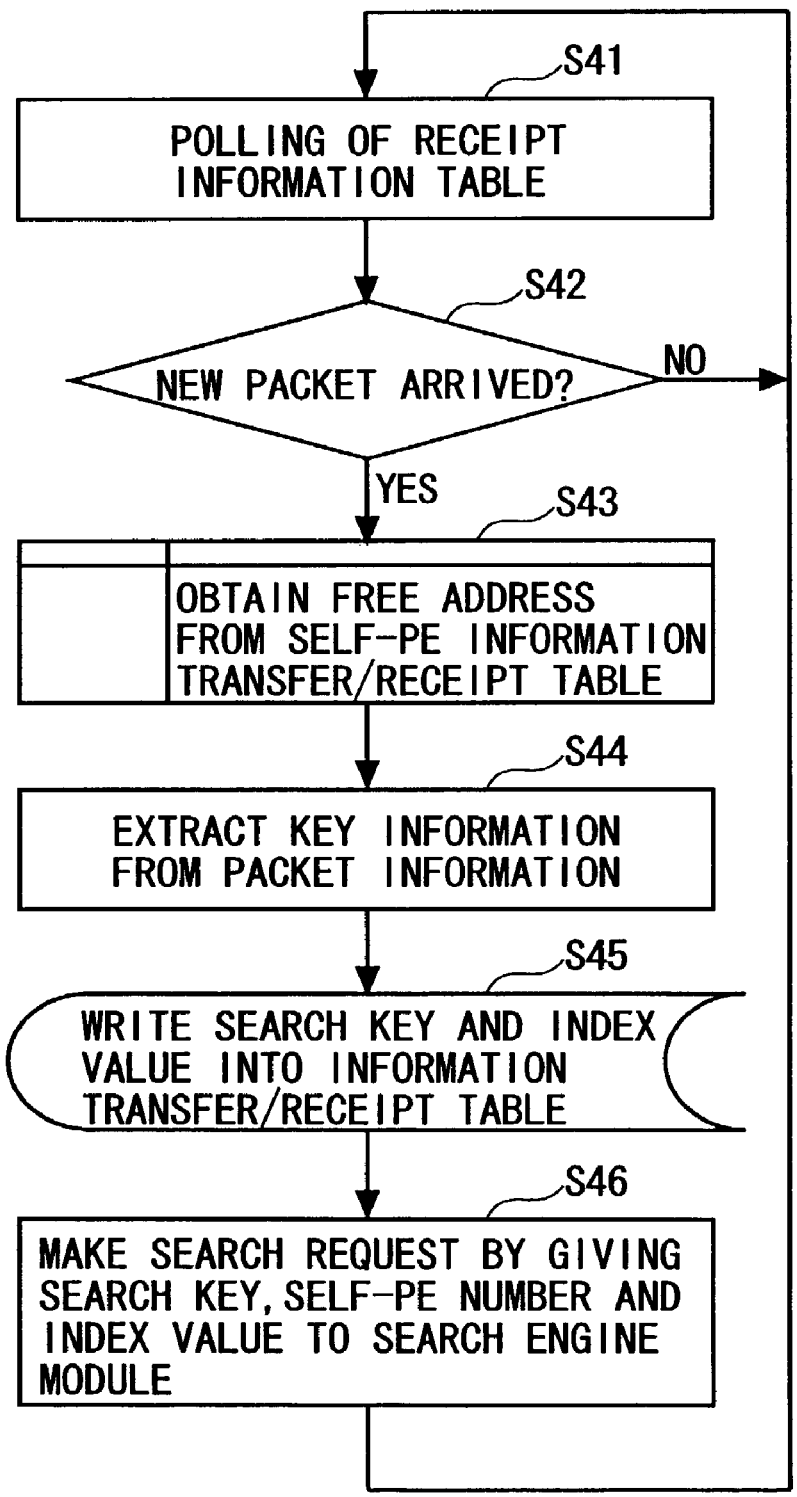
FIG. 4 is an explanatory flowchart showing processing steps of a pre-search process processor in FIG. 2.

FIG. 3 shows an example of a detailed architecture of the input interface module 50 in FIG. 2. FIG. 4 is an explanatory flowchart showing processing steps (S41~S46) of the processor PE in charge of the pre-search process in FIG. 2. Referring to FIGS. 2, 3 and 4 in combination, the packet inputted to the packet processing engine module 10 is processed in the input interface module 50.

In the input interface module 50, FIFOs (#0 through #x) 51 and receipt information tables (#0 through #x) 52 corresponding respectively to the FIFOs (#0 through #x) 51, are provided for every physical interface (for every input port or input physical link). Therefore, a multiplexing/demultiplexing module 53 demultiplexes a multiplexing-transferred input packet for every FIFO 51 corresponding to the physical interface.

When each FIFO 51 receives the data having a length of predetermined bytes ranging from the head of the input packet, a write control module 54 obtains a free address in the packet buffer module 30 and writes the received data in the corresponding receipt information table 52 with this free address serving as a buffer head address.

The write control module 54 writes, in this receipt information table 52, further an arrival flag, a receipt status (a flag of self-processing status that shows an on-processing-status of a first fragment, a middle fragment or a last fragment of the packet) and a header information of a new packet.

The write control module 54 acquires a new free address from the packet buffer module 30 each time the data having the predetermined byte length are stored in each FIFO 51, and goes transferring the packet data of the input packet to the packet buffer module 30 in a way that executes a chain process (chaining).

Note that the head information is retained in the receipt information table 52 till the end data of the input packet are received. The processor in charge of the pre-search process may also be constructed including this input interface module 50.

To describe it in greater detail, the IP packet terminated at each circuit termination (not shown) is inputted to the input interface module 50 in a such way that the IP packet is fragmented into cells or fixed-length packets and then reassembled. Therefore, the input interface module 50 is constructed for every input link (for every physical interface).

The packets having reached the input interface module 50 are allocated to the respective buffers (FIFOs 51) according to the input port numbers each registered in the header field.

The write control module 54, when the data are stored in the FIFO 51, obtains one free address in the packet buffer module 30 and writes the packet data to the packet buffer module 30.

The input interface module 50 executes processing being aware of a frame and monitors a status transition as to whether the cell arriving at the FIFO 51 is defined as a first or middle or last fragment of the packet.

The write control module 54, if the cell arriving at the FIFO 51 is defined as a first fragment (which implies an arrival of a new packet), writes the acquired head address, receipt status and header information from the packet buffer module 30 into the receipt information table 52 corresponding to FIFO 51.

The following are pieces of information written into this receipt information table 52. These pieces of information are:

(1) New packet arrival flag (ON (set to [1]) when receiving the last cell and OFF (set to [0]) when received by the pre-search process processor;

(2) Packet buffer head address (a storage address of the packet data into the packet buffer module 30);

(3) Receipt status (an on-receipt status of the frame: a first (fragment) process, a middle (fragment) process and a last (fragment) process);

(4) Header information (a packet header field at the head of the frame); and (5) Packet length (a packet length of the frame concerned).

This receipt information table 52 is stored per frame with these pieces of information given above and contains storage fields for a plurality of cells per FIFO 51. A capacity (#0 through #x) of the receipt information table 52 depends on a throughput of the pre-search process processor.

An information write status into the receipt information table 52 is cyclically updated each time a new packet arrives. In this case, the write control module 54, when the new packet arrival flag remains in the ON-status, writes nothing and notifies of being impossible of receiving in the input direction (that is known as a back pressure).

The input interface module 50, while being aware of the frame of the data reached, obtains a new free address from the packet buffer module 30 each time the data for every FIFO 51 are stored, and transfers the packet data to the packet buffer module 30 in a way that executes the chain process. The new packet arrival flag in the receipt information table 52 is set ON at a stage where each of the FIFOs 51 receives the end data of the packet.

The processors PE#1 through PE#n in charge of the pre-search process, which are assigned the pre-search process and in their free-of-processing status, carry out polling scan of the receipt information table 52 at their timings.

Then, the processor PR in charge of the pre-search process, which detects, after the new packet arrival flag has been set, this status for the first time, undertakes the process. The processor PE in charge of the pre-search process that has undertaken the process copies necessary items of information to an information transfer/receipt table 41 which will be explained later on, and thereafter rewrites OFF the new packet arrival flag in the receipt information table 52. The receipt information table 52 is thereby released.

<Information Transfer/Receipt Table and Processor in Charge of Pre-Search Process>

Figure 5:
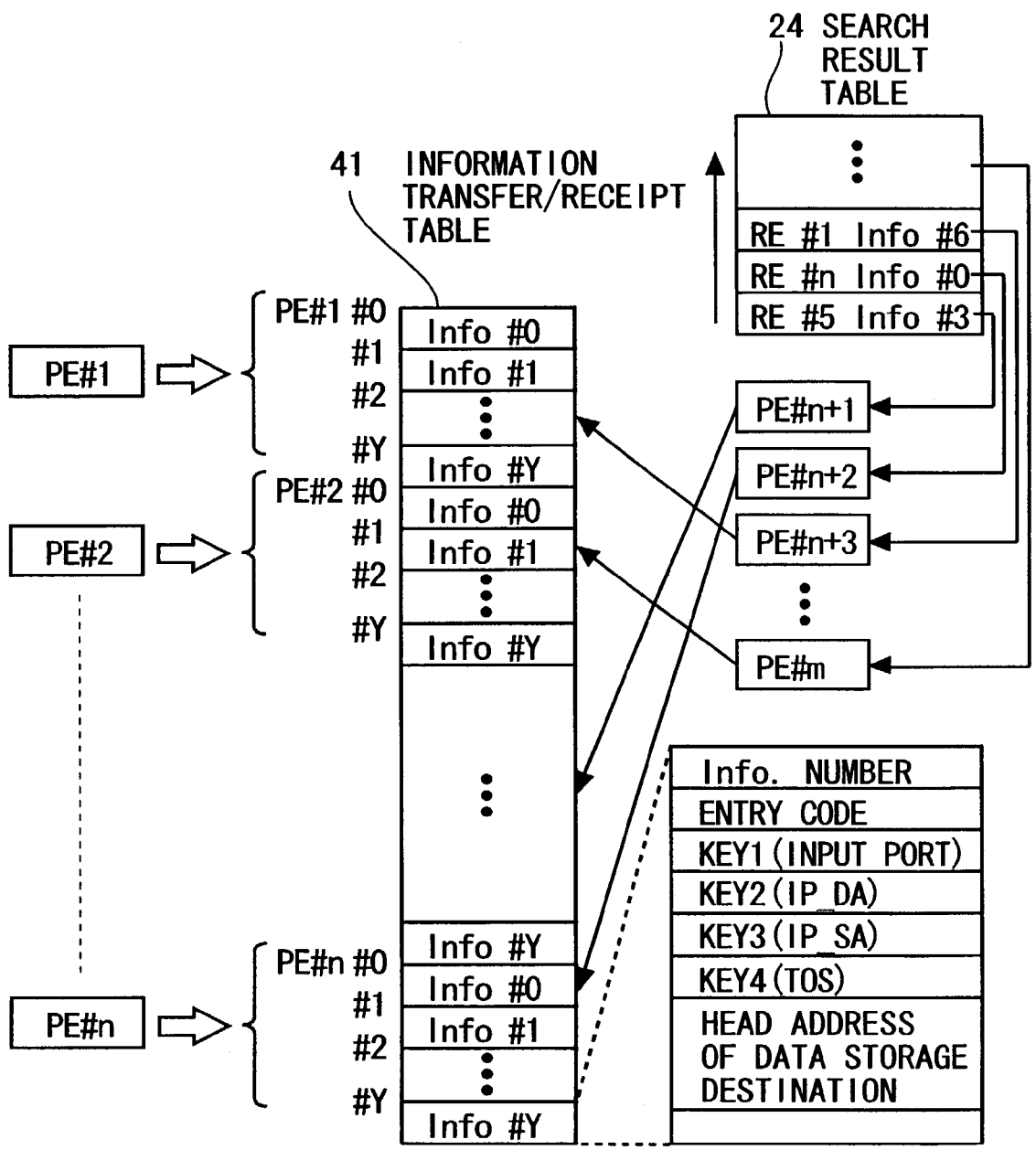
FIG. 5 is a block diagram showing an example of a detailed structure of an information transfer/receipt table in FIG. 2.

FIG. 5 illustrates a detailed structure of the information transfer/receipt table 41 in FIG. 2. Referring to FIGS. 2, 4 and 5 in combination, the processor PE having undertaken the pre-search process acquires a free address mapping to any one of storage fields Info.#0 through Info.#Y from the dedicated information transfer/receipt table 41 corresponding to the undertaker processor PE itself, and writes into the information transfer/receipt table 41 necessary items of information such as a head address of a packet data storage location in the packet buffer module 30, header information serving as a basis of search data and so forth.

The processor PE in charge of the pre-search process, after writing the necessary items of information into the information transfer/receipt table 41, extracts data needed for the search process through a check process about the input packet, then sends a search key (a destination IP address: IP-DA), an index value (Info.number) of the information transfer/receipt table 41 and a self-processor (PE) number to the search engine module 20, and thus makes a search request.

Herein, each of the storage fields Info.#0 through info.#Y in the information transfer/receipt table 41 is stored, subsequent to Info.number as the index value, with an entry code indicating IPv4 or IPv6 etc, an input port number, a destination IP address (IP-DA), a source IP address (IP-SA) and so on.

Herein, a table count (Y) per processor PE in charge of the pre-search process is defined as a parameter determined by a throughput ratio of the pre-search process to the post-search process. Further, the number (n) of the processors PE#1 through PE#n in charge of the pre-search process and the number (m) of the processors PE#1 through PE#m in charge of the post-search process, are parameters determined by a ratio of a pre-search process time to a post-search process time.

<Cooperation of Processor in Charge of Pre-Search Process with Search Engine Module>

Figure 6:
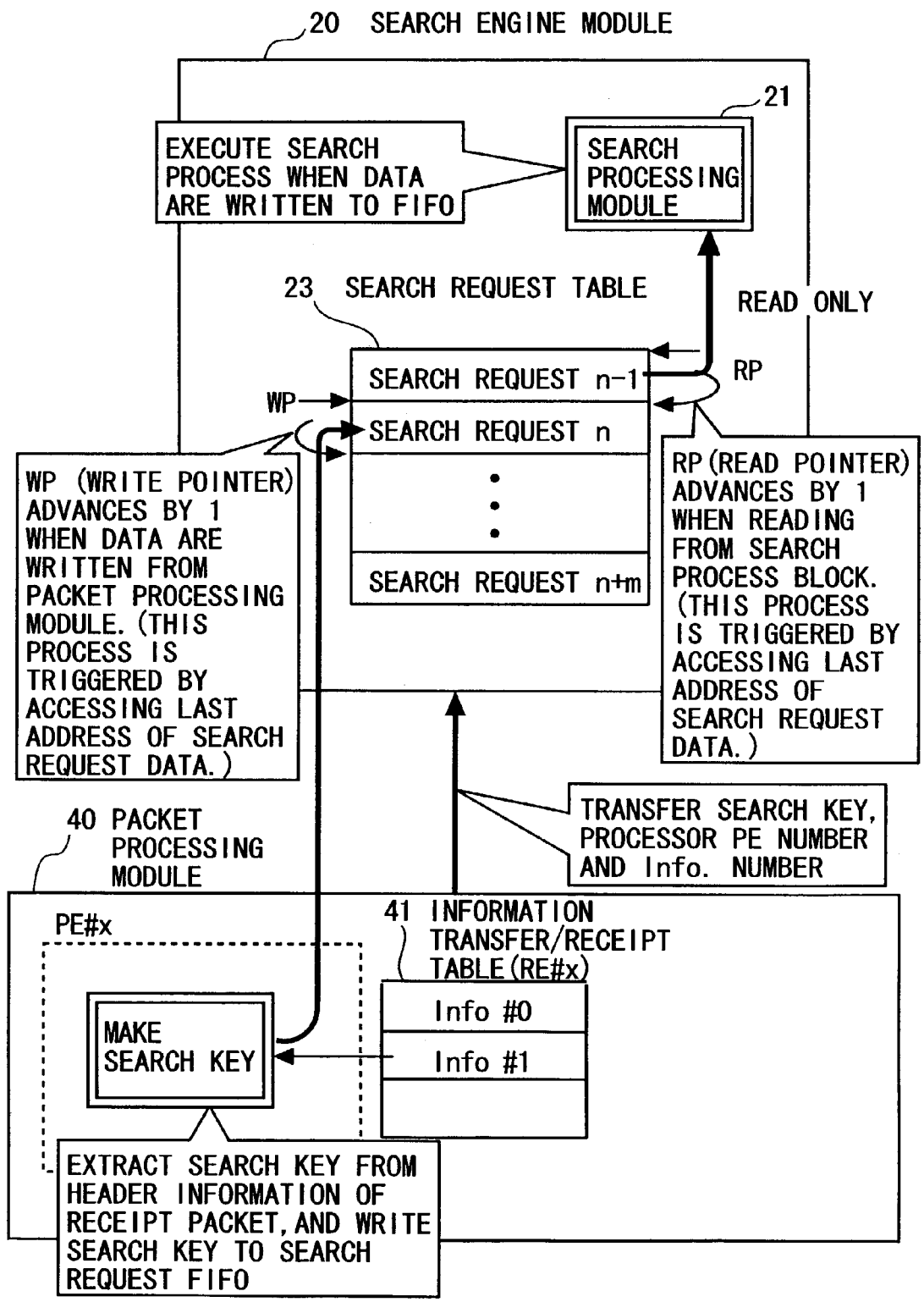
FIG. 6 is an explanatory diagram showing how the pre-search process processor cooperates with a search engine module in FIG. 2.

FIG. 6 shows how the processor PE in charge of the pre-search process cooperates with the search engine module 20 in FIG. 2.

Referring to FIGS. 2 and 6 in combination, if a scheme is that an interface between the search engine module 20 and the packet processing module 40, to be specific, an interface between a search request table 23 constructed of FIFO in the search engine module 20 and each processor PE in charge of the pre-search process and the information transfer/receipt table 41 in the packet processing module 40, is set physically individual, there does no occur any queue due to a conflict between the plurality of processors PE in charge of the pre-search process, thereby improving the throughput. As will be explained later on, if this interface is used in common, a quantity of the hardware can be reduced.

The interface for a search request for the search engine module 20 can be, if viewed from the packet processing module 40, accessed always corresponding to only one-request fields in the search request table 23. When one search request is written into this search request table, a write pointer WP automatically moves to a next field. Accordingly, each of the processors PE in charge of the pre-search process is not required to be aware of the address of the search request table 23, i.e., the write to the same address may always be effected.

The search engine module 20 monitors an occupied/unoccupied status of FIFO of the search request table 23. When the data are written to this FIFO, the search processing module 21 reads the data and executes the search process. When the search processing module 21 reads from the search request table 23, a read pointer RP moves to the next field, and may therefore access the same address at all times.

Note that the search request table 23 is provided for every pre-search process processor PE and takes a FIFO structure in which a next queue comes round when a series of data have been written (the address advances).

Further, if not dependent on the interface of the pre-search process processor PE, the interface is provided in each processor PE, and it is therefore possible to prevent a decline of the throughput due to simultaneous accessing between the processors PE. Accordingly, in this case, the PE number may be unnecessary.

<Search Engine Module>

Figure 7:
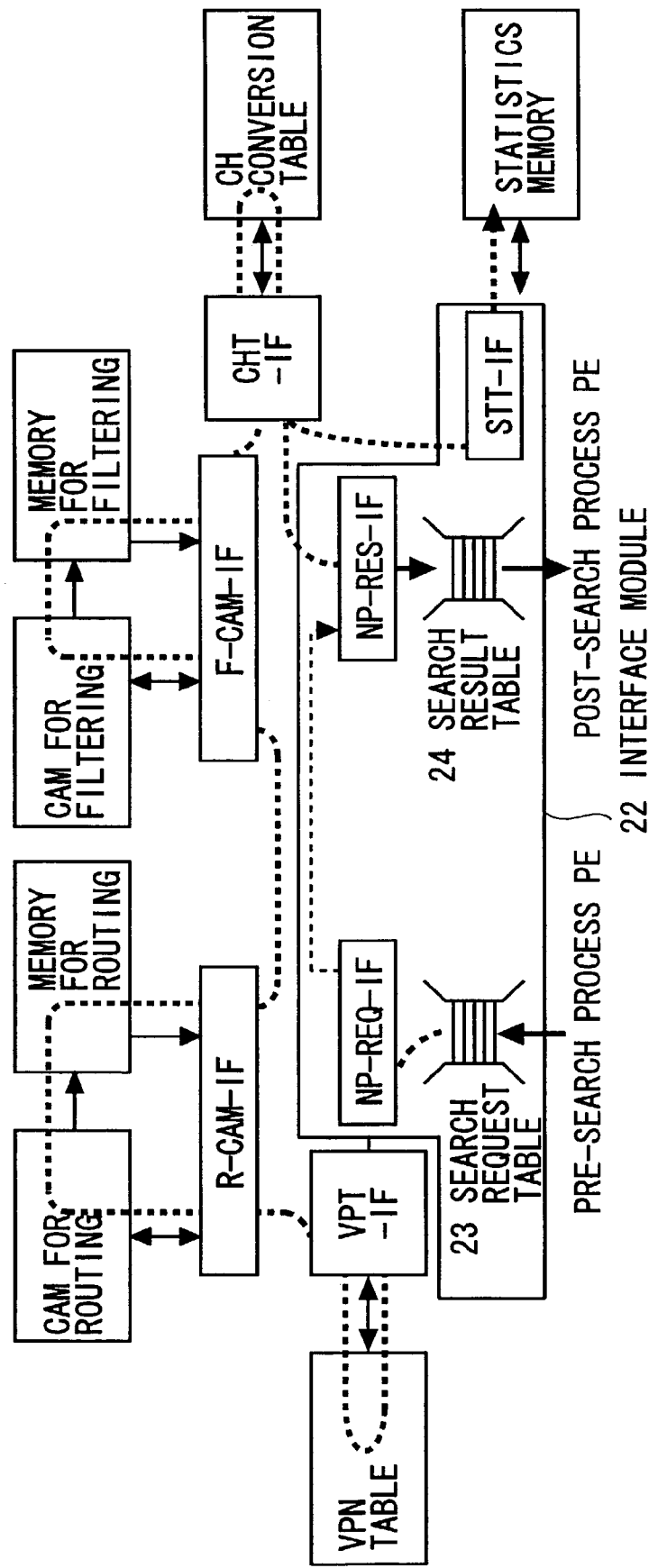
FIG. 7 is a block diagram showing an example of a detailed architecture of the search engine module in FIG. 2.

FIG. 7 shows a detailed structure of the search engine module 20 in FIG. 2. Referring to FIGS. 2 and 7 in combination, the search engine module 20 executes various categories of search processes (such as a routing (route information) search, a filtering search, a classifying search, etc) on the basis of the search key transferred from the processor PE in charge of the pre-search process. Then, the search engine module 20 attaches, to the information on the search result, the index value and the PE number transferred from the processor PE in charge of the pre-search process, and thus sends the same information back to the processor PE in charge of the post-search process of the packet processing module 40. Note that the PE number can be herein extracted from the search request address in the search request table 23.

To describe it more specifically, the processor PE in charge of the pre-search process writes the PE number, a table number (the storage fields Info.#0 through Info.#Y in the information transfer/receipt table 41) and the search key data into the search request table 23 of the interface module 22.

A separation of the search key information and the PE information (the PE number and the table number) in an interface module NP-REQ-IF, is triggered by the search request table 23 changing from a free status to an information-stored status. Then, the search key information is sent to a search process routine in the search processing module 21, while the PE information is sent to an interface module NP-RES-IF.

In the search process routine in the search processing module 21, to start with, a VPN (virtual Private Network) table is accessed via an interface module VPT-IF on the basis of the input port number used as a search key, thereby obtaining VPN identifying information VPN-ID.

Subsequently, the search processing module 21 searches for an output router port (which is an output port number of the IP packet processing device 1 serving as a router) with the VPN identifying information VPN-ID and the destination IP address IP-DA being used as a search key by use of a routing CAM of the search memory through an interface module R-CAM-IF. The output router port per entry is written to a memory for routing.

Thereafter, the search in the filtering CAM is carried out through an interface module F-CAM-IF on the basis of all pieces of search key information such as an L2 header, an L3 header and an L4 header. Actions of filtering are written to a filtering memory, and there are set flags corresponding to the actions about discarding, transparence, an encapsulating target, a decapsulating target, a matter target and a classifying target.

Further, there are executed, based on the previously searched output router port by use of a channel (ch) conversion table via an interface module CHT-IF, a conversion into tag information within an unillustrated switch (switch fabric) provided at a posterior stage in the case of an ingress, and a conversion into an output physical port of the posterior switch or into a channel in the case of an egress.

An interface module NP-RES-IF writes, into a search result table 24, a finally acquired piece of destination information, the filtering action flag and the classifying information to which the PE number and the table number that are defined as the PE information transferred beforehand are added.

Moreover, the search processing module 21 simultaneously executes a statistics information process for routing, i.e., the statistics information process for every entry in the routing CAM. Note that the search engine module 20 described above executes a pipeline process at a processing stage, whereby all the search processes are terminated within a fixed process time.

<Cooperation of Processor in Charge of Post-Search Process with Search Engine Module>

Figure 8:
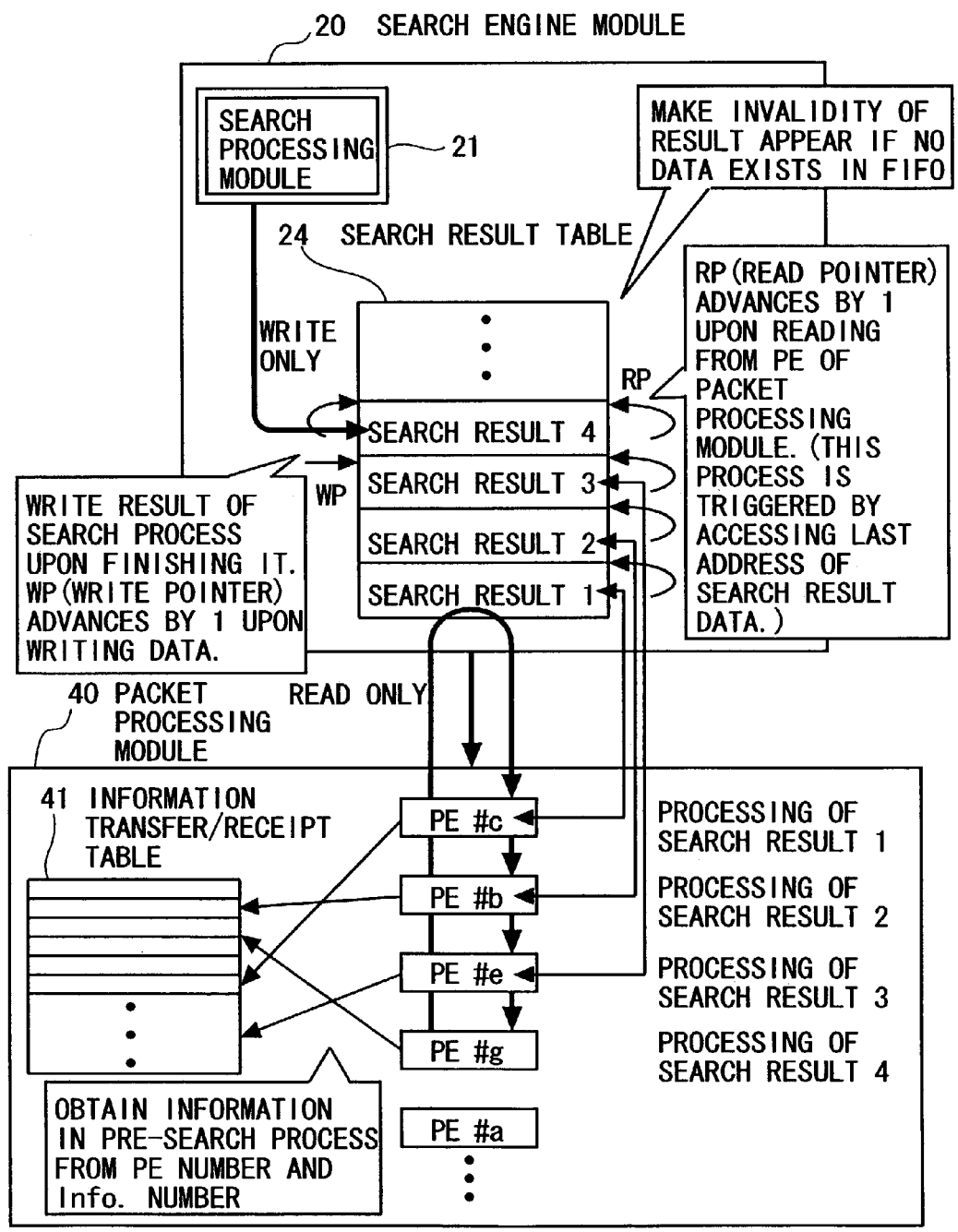
FIG. 8 is an explanatory diagram showing how a post-search process processor cooperates with a search engine module in FIG. 2.
Figure 9:
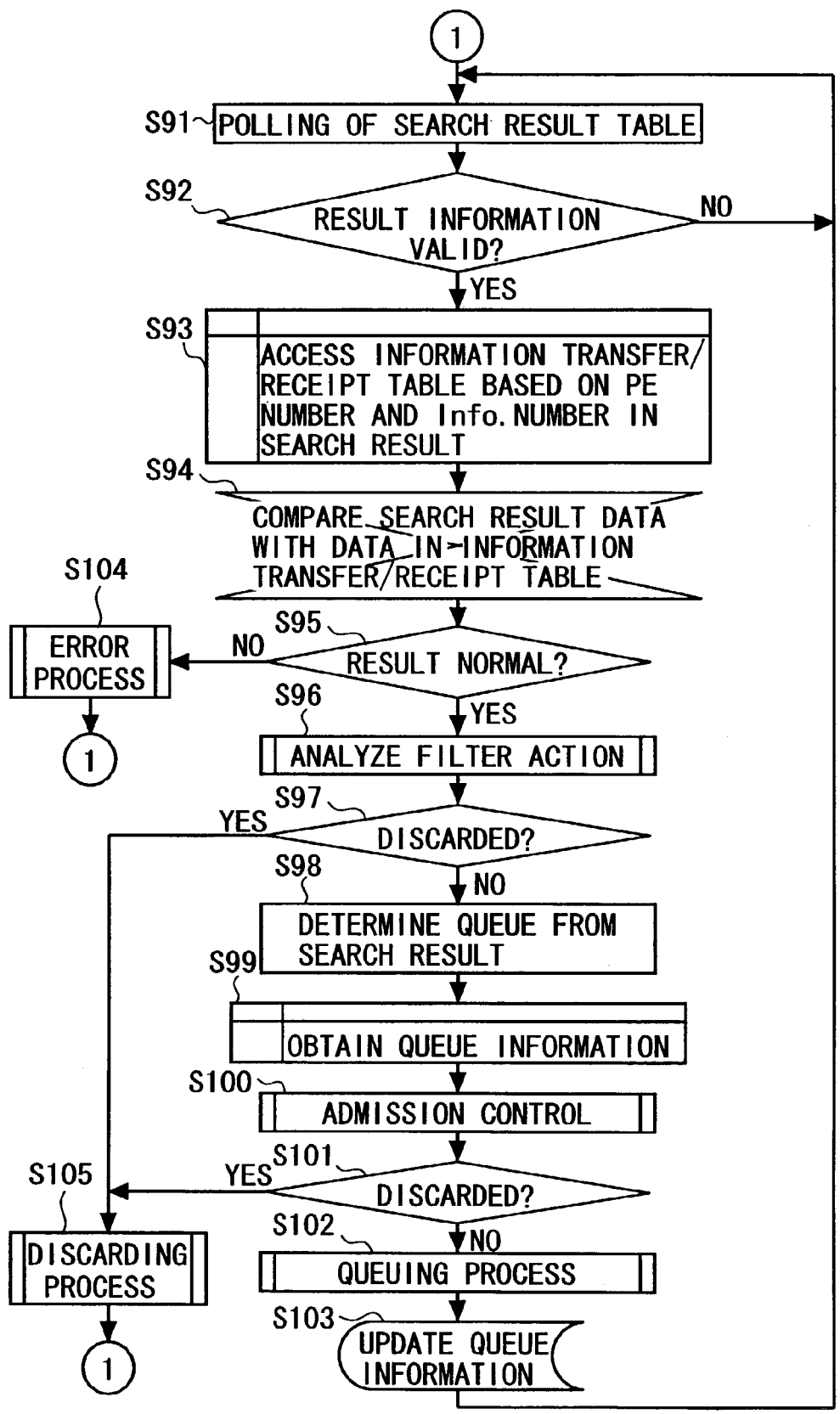
FIG. 9 is an explanatory flowchart showing processing steps of the post-search process processor in FIG. 2.

FIG. 8 shows how the processor PE in charge of the post-search process cooperates with the search engine module 20 in FIG. 2. FIG. 9 is a flowchart showing processing steps (S91~S105) of the post-search process processor PE.

Referring to FIGS. 2, 8 and 9 in combination, if a scheme is that an interface between the search engine module 20 and the packet processing module 40, i.e., an interface between the search result table 24 constructed of FIFO in the search engine module 20 and each processor PE in charge of the post-search process in the packet processing module 40, is used in common, a plurality of processors #n+1 through PE#m in charge of the post-search process are capable of processing irrespective of, i.e., without depending on the plurality of processors PE#1 through PE#n in charge of the pre-search process.

The search result table 24 has a search result valid flag contained in the head address, and the information on the search result is written in from an address next to the head address. The processors PE in charge of the post-search process, which are assigned the post-search process and in their free-of-process status, respectively perform polling scans over the search result table 24 at their timings and, if the search result valid flag shows a validity, execute processing by use of information on the search result subsequent thereto. The processor PE in charge of post-search process, which accesses for the first time when the search result valid flag in the search result table 24 is in its flag-ON status, undertakes the process.

A search result interface with the search engine module 20 is structured such that what is seen from the packet processing module 40 is just one piece of search result, and the sequence of search results turns round (the address moves to a next set of results) upon accessing the last address. Namely, the structure is that the processor PE in charge of the post-search process is allowed to access only once the valid search result.

If there is still the information on the valid search result, a next item of information comes in upon accessing the last address. Whereas if there is no valid data in the search result table 24 (if empty in FIFO), [0] is seen at the head address, and the invalid data are visible to the processor PE in charge of the post-search process.

The search result table 24, which is seen from the processor PE in charge of the post-search process, is structured to make the unprocessed information visible at all times. A read address is updated by reading the search result table 24, and hence, if an unprocessed search result exists on FIFO of the search result table 24, the data thereof become visible at a next access.

Further, if no data exists on FIFO of the search result table 24, all [0] is seen in the head data of the search result information. Namely, a flag indicating a validity or an invalidity of the search result information is assigned to the head data of the search result table 24, and, when this flag shows [0], the packet processing module 40 executes no processing.

The processor PE having undertaken the post-search process accesses the information transfer/receipt table 41 with the PE number and the index value of the search result information being used as a search key, and executes the packet routing process such as registering, in a class queue per destination, a result of adding together the processing information of the processor PE in charge of the pre-search process and the search result information given from the search engine module 20, or a discarding process thereof and so on.

<Throughput of IP Packet Processing Device>

Figure 10:
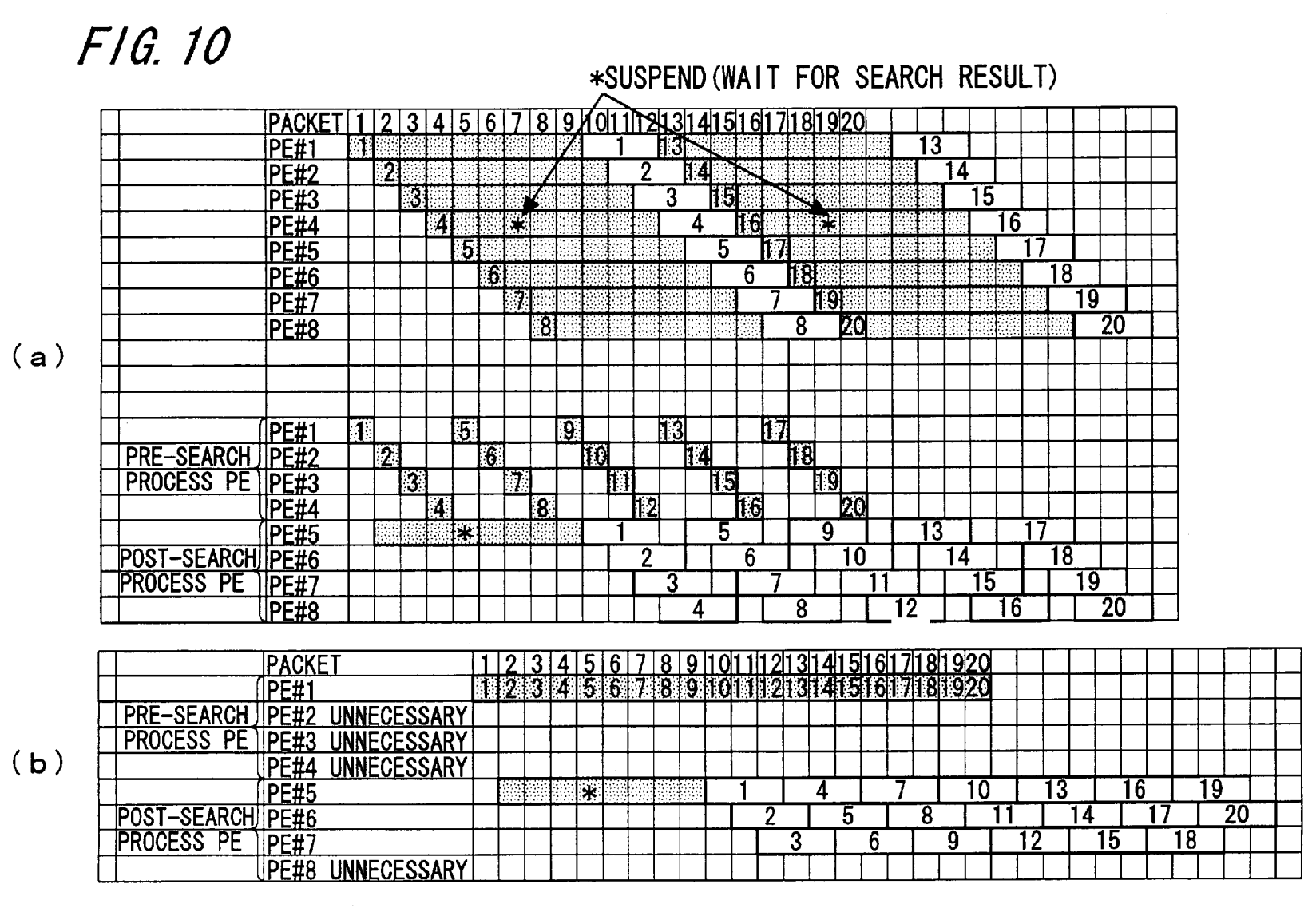

In the IP packet processing device 1 in the first embodiment discussed above, the pre- and post-search processes of the packet routing process are executed by the different processors PE, whereby the pre- and post search processes can be, as shown in FIG. 10, carried out absolutely independently. As a result, the search time can be eliminated from the packet routing process time, thereby enabling a scheme of improving the throughput. Further, a suspend time of waiting for the search result can be removed, and therefore a processor operation rate can be theoretically improved up to 100%.

Moreover, in the case where the pre- and post search processes are executed by the different processors PE, when the processes are transferred and received directly between the processors PE, there are needed procedures that are as complicated as they are, and, if the search process is time-consuming to some extent, it is required that the process be queued up till the search result returns. If the interface module 22 of the search engine module 20 is used as a medium for transferring and receiving the information between the processor PE in charge of the pre-search process and the processor PE in charge of the post-search process, however, there is yielded such an advantage that the queuing process and the complicated procedures become unnecessary.

For enabling this advantage to be actualized, the search engine module 20 takes an architecture in which the interface module 22 is added as a field for transferring and receiving the information between the processors PE as well as the information necessary for the search, and the search result is transparent through this field.

Herein, the discussion in greater detail will be made based on the premise that a pre-search process time is the same as a minimum packet input time, a search latency period is 8 times the minimum packet (input) time, a post-search process time is set 3 times the pre-search process time, and each processor PE is a single task processor.

An upper chart in FIG. 10(a) shows a case in which each of the plurality of processors PE executes all the packet processes (the search process and the packet routing process), wherein input packets 9 through 12 can not be processed because of all the processors PE being fully engaged. It is a wait for a search result, and the task is in its suspended status or on the post-search process. It is required for making also the input packets 9 through 12 processable that another four pieces of processors PE be added or the number of the processing steps and the latency period of the search be reduced.

A lower chart in FIG. 10(a) shows a case in which the pre- and post-search processes are, as by the IP packet processing device of the present invention, processed by the different processors PE. In this case, since the pre- and post-search processes are processed by the different processors PE, there does no occur the task suspension due to the wait for the search, and hence all the packets can be processed. Further, the premise of the process time in this example may be such that there are provided, as shown in FIG. 10(b), a single piece of processor PE in charge of the pre-search process and three pieces of processors PE in charge of the post-search process.

Namely, a throughput that is approximately ⅓ the throughput of the same type of processors PE is enough to actualize a series of packet routing processes (the search process and the packet process). As shown in the upper chart, the scheme that the series of packet processes are executed by the same type of processors PE involves using twelve pieces of processors PE, and by contrast the same packet processes can be processed by four pieces of processors PE at the minimum according to the present invention.

SECOND EMBODIMENT

Figure 11:
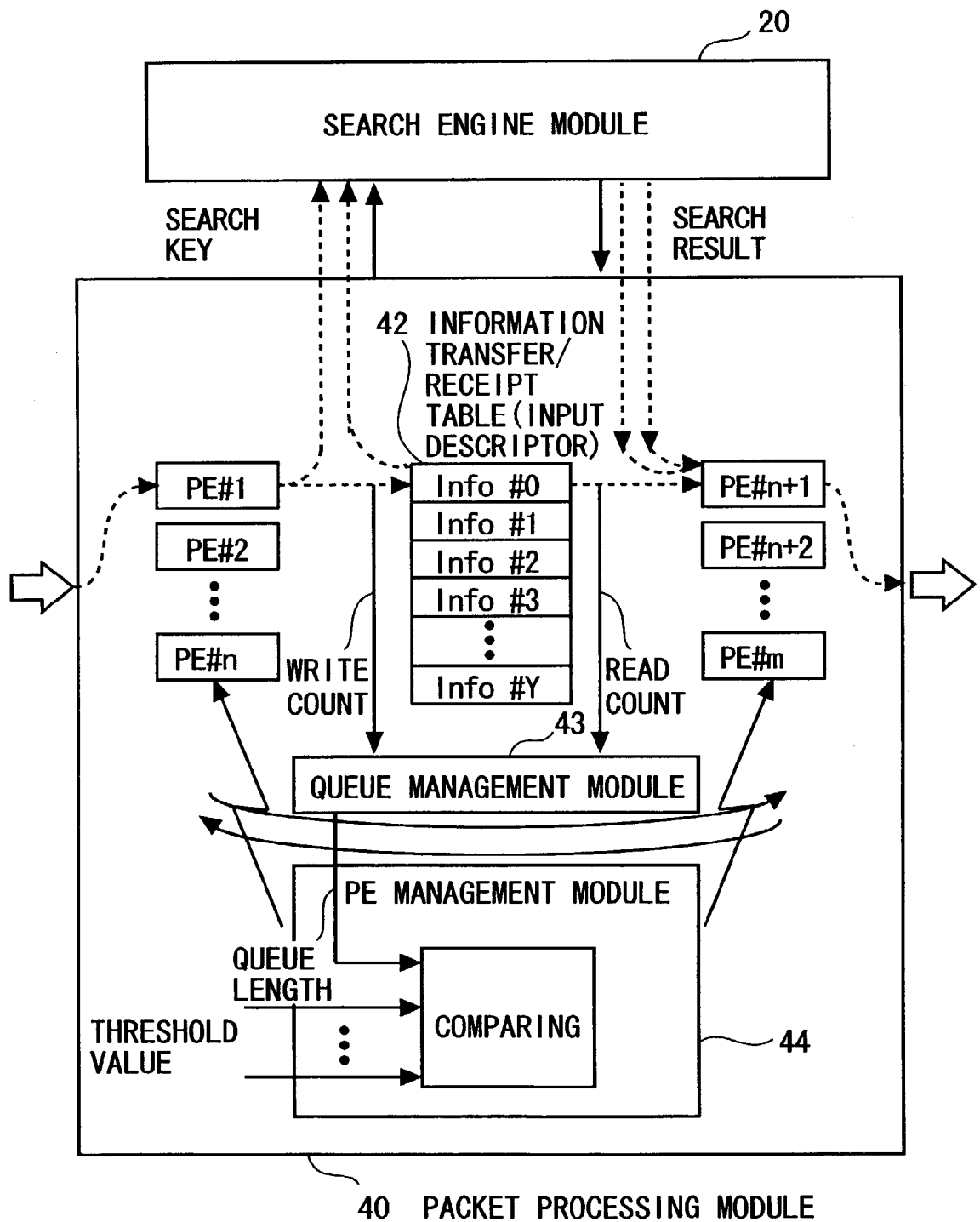
FIG. 11 is a block diagram showing an architecture of the IP packet processing device in a second embodiment of the present invention.
Figure 12:
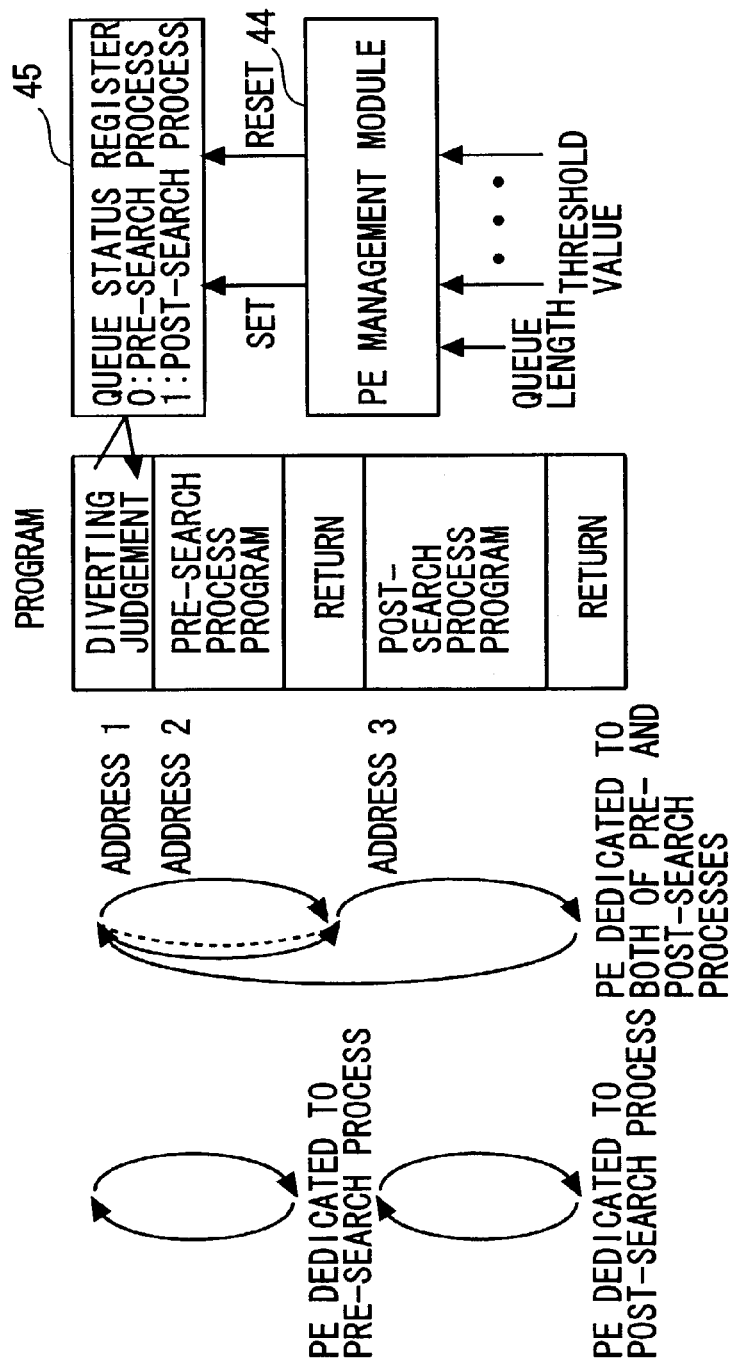
FIG. 12 is an explanatory diagram showing a switching algorithm of switching the pre- and post-search process processors in FIG. 11.
Figure 13:
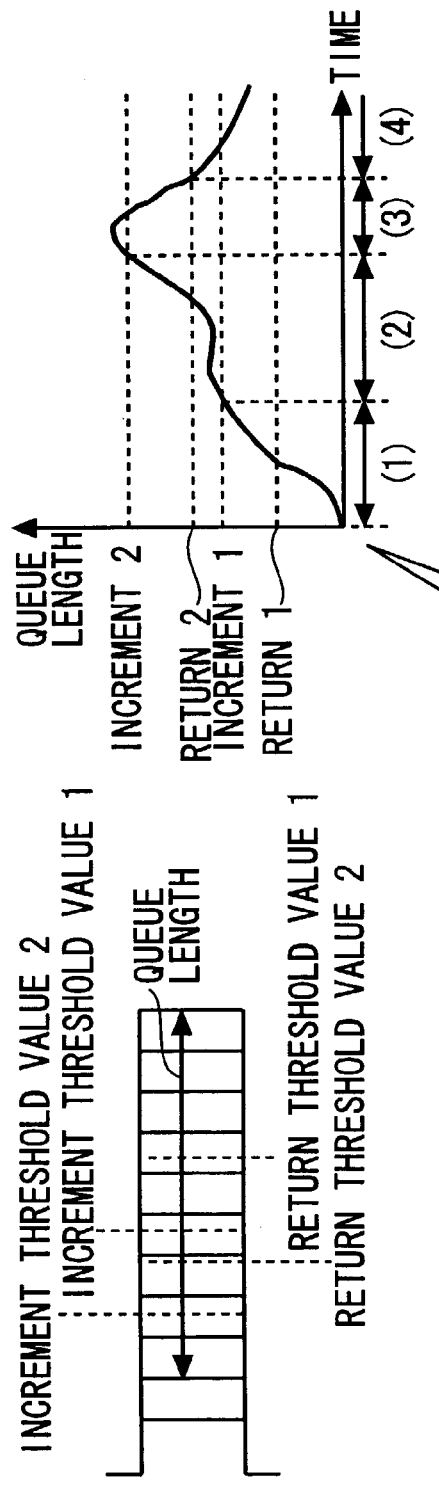
FIG. 13 is an explanatory diagram showing threshold value control when switching the pre- and post-search process processors in FIG. 11.

The IP packet processing device in a second embodiment of the present invention will be explained with reference to FIGS. 11, 12 and 13 in combination. FIG. 11 shows an architecture of the IP packet processing device in the second embodiment. FIG. 12 is an explanatory diagram showing a method for switching control of the pre- and post-search processes of the processors. FIG. 13 is an explanatory diagram showing an outline of control of a threshold value.

Normally, in the case of dividing the process before and after the search process, the post-search process requires a greater amount of process time than the pre-search process does. Accordingly, if an extreme burst traffic occurs, i.e., if consecutive arrivals of short packets occur, the post-search process does not catch up with this traffic, and it follows that the unprocessed information stays in the information transfer/receipt table for transferring and receiving the information between the processors in charge of the pre-search process and the processors in charge of the post-search process.

Further, the pre-search process time differs depending on a frame format (MPLS (Multi Protocol Label Switching), PPP (Point-to-Point Protocol), IPv4, IPv6 and so on) of the input packet, and the post-search process time also differs depending on whether admission control (Weighted Random Early Discard (WRED)) is needed, whether the encapsulation is required, and so forth.

Essentially, there is no problem if the throughput and the number of the processors are well over the worst traffic pattern. In fact, however, a deviated input of the worst traffic is given a clear-cut point of view as a rare pattern in terms of a cost performance and an implementation condition or the throughput of the processor, and the throughput is calculated with an average traffic.

The IP packet processing device 1 in the second embodiment, as in the case of the IP packet processing device 1 according to the first embodiment, includes the packet processing engine module 10, the search engine module 20 and the packet buffer module 30. Herein, the input interface module 50 and the output interface module 60 in the packet processing engine module 10 and the packet buffer module 30 have the same configurations, and hence their illustrations are omitted.

This IP packet processing device 1 monitors a queue length of an information transfer/receipt table (input descriptor) 42, and dynamically re-changes the processors PE assigned the pre- and post-search processes in accordance with how much the unprocessed data stay therein.

With this scheme, the processors PE initially assigned the pre-search process are reassigned the post-search process if there increases the queue length of the information transfer/receipt table 42 having the FIFO-based structure, thus assisting the post-search process. When the queue length of the information transfer/receipt table 42 decreases back, these processors are reassigned back to the initial pre-search process.

A queue management module 43 in the packet processing module 40 controls the write pointer WP and the read pointer RP for the information transfer/receipt table 42, thereby monitoring the queue length.

A PE management module (task manager) 44 compares the queue length of the information transfer/receipt table 42 with a threshold value, and dynamically changes an allocation of the processors PE in charge of the pre- and post-search processes in accordance with how much the queue stays.

More specifically, the PE management module 44 dynamically changes the allocation of the processors PE in charge of the pre- and post-search processes in the following way.

(1) If the queue length of the information transfer/receipt table 42 is [large] (the post-search process is congested), the PE management module 44 reallocates the processors PE in charge of the pre-search process to the post-search process so that a sharing ratio becomes, e.g., 1:3.

(2) If the queue length of the information transfer/receipt table 42 is [intermediate] (the post-search process is slightly congested), the PE management module 44 reallocates the processors PE in charge of the pre-search process to the post-search process so that the sharing ratio becomes, e.g., 1:2.

(3) If the queue length of the information transfer/receipt table 42 is [small] (a normal state), the PE management module 44 reallocates the processors PE in charge of the post-search process to the pre-search process so that the sharing ratio becomes a normal value, e.g., 1:1.

The PE management module 44 monitors the queue length of the information transfer/receipt table 42 and reflects a monitored status in a queue status register 45 of the queue management module 43. A hysteresis is given to On/Off values so that a status transition does not oscillate. Herein, the statuses are defined as follows:

(1) Status 1 bit: Set when over an increment threshold value "1" and reset when less than a return threshold value "1"; and (2) Status 2 bits: Set when over an increment threshold value "2" and reset less than a return threshold value "2".

In the case of desiring to further subdivide the status, this can be attained by increasing the bit number. Moreover, information indicating which status bit the processor PE refers to, is given by a start parameter to each processor PE. For instance, if the number of all the processors PE is 8 and when desiring to make a change corresponding to the status such as 4:4→3:5→2:6, the allocation is that there are two pieces of processors PE dedicated to the pre-search process, four pieces of processors PE dedicated to the post-search process and two pieces of processors PE assigned both of the pre- and post-search processes. In this case, one of the processors PE assigned both of the pre- and post-search processes selects the process with the status 1 bit, and the other processor PE selects the process with the status 2 bits.

THIRD EMBODIMENT

Figure 14:
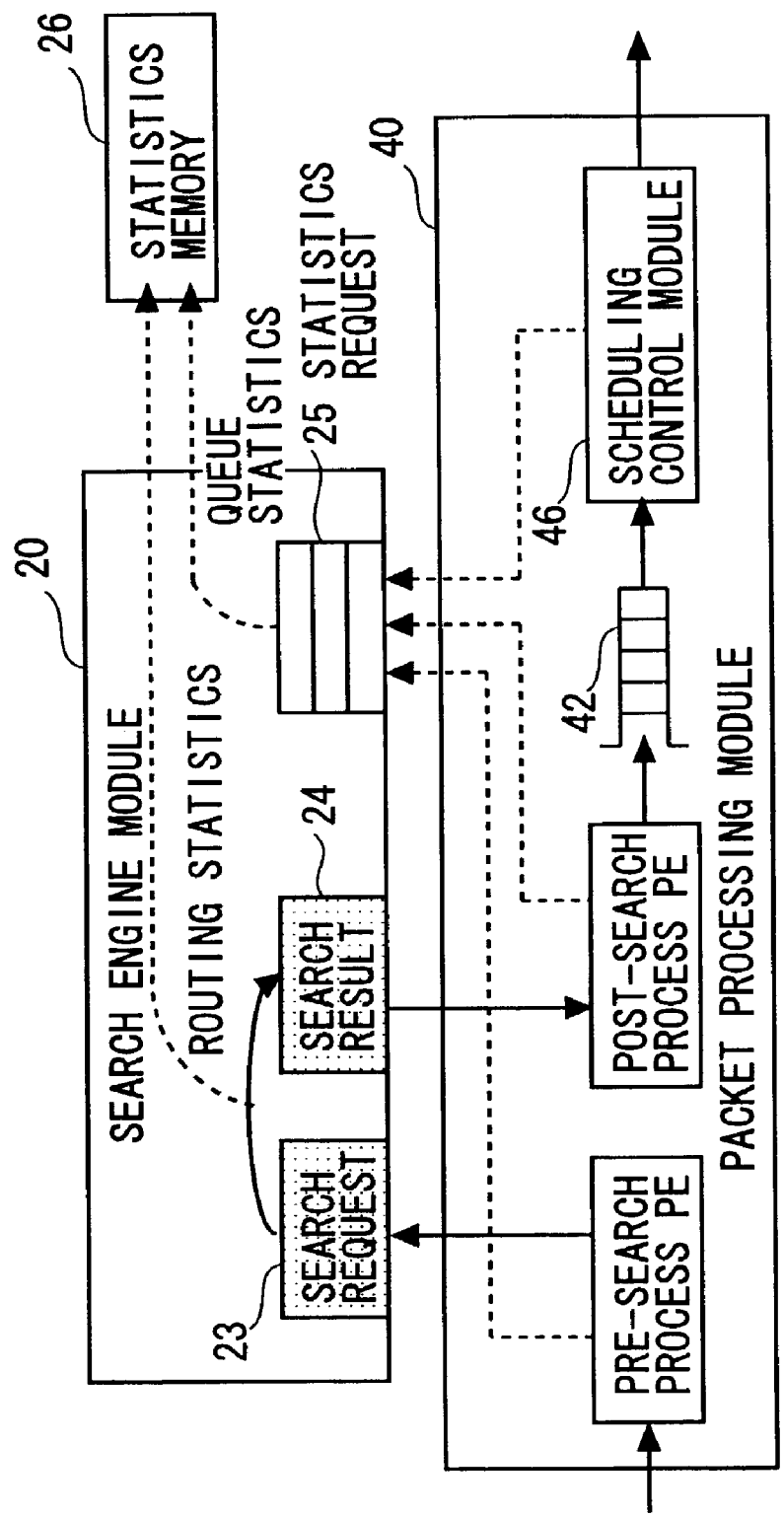
FIG. 14 is a block diagram showing an architecture of the IP packet processing device in a third embodiment of the present invention.

Next, the IP packet processing device in a third embodiment of the present invention will be described referring to FIG. 14.

It is necessary as a maintenance function of the IP packet processing device 1 to gather pieces of statistics information, however, two items of statistics are required, i.e., one category is routing entry-by-entry statistics, and another category is queue statistics in the packet buffer module 30.

Essentially, the routing statistics are information known by only a search processing function module of the search engine module 20, and, by contrast, the packet queue statistics are information known by only a queuing or scheduling function module of the packet process engine module 10.

Therefore, a problem is that these two items of information are read from different function modules and need reediting, and a relationship between the input interface information and the queue information is unknown.

In the IP packet processing device 1 according to the third embodiment, a statistics request table 25 having a FIFO-based structure is provided as a statistics request interface between the search engine module 20 and the packet processing module 40 of the packet processing engine module 10 that performs queuing and scheduling.

This architecture enables a unitary management of the statistics information and makes it possible to gather the statistics of input interface-by-interface information for every post-search queue.

In the IP packet processing device 1 according to the third embodiment, each of the processors of the packet processing module 40 cooperates with the search engine module 20, thereby unitarily managing the statistics information in a statistics memory 26 as an external statistics area of the search engine module 20.

The search engine module 20, in the routing statistics, gathers, in the search memory 26, the statistics for every entry that hits the data in the CAM serving as the search memory.

Further, the packet processing module 40 gathers next queue statistics through the statistics request table 25 of the search engine module 20.

(1) Queue Statistics in Pre-Search Processing Module

The pre-search process processors PE in the packet processing module 40 notifies the statistics request table 25 of the number of packets discarded by a frame check, a header check etc for every input interface. The statistics of the packets discarded before making the search request can be gathered in the statistics memory 26.

(2) Queue Statistics in Post-Search Process

The post-search process processors PE in the packet processing module 40 notifies, based on the search result read from the search result table 24, the statistics memory 26 of a packet arrival count or discard count for every destination queue through the statistics request table 25 for every input interface.

Moreover, the post-search process processors PE notifies, based on the search result, the statistics memory 26 of actions (such as the discarding process, extraction etc) through the statistics request table 25 for every input interface.

(3) Queue Statistics in Scheduling Process

A scheduling control module (scheduler) 46 of the packet processing module 40 notifies the statistics memory 26 of a packet count (a transparent frame count) of the packets read actually from the queue through the statistics request table 25 for every input interface.

FOURTH EMBODIMENT

Figure 15:
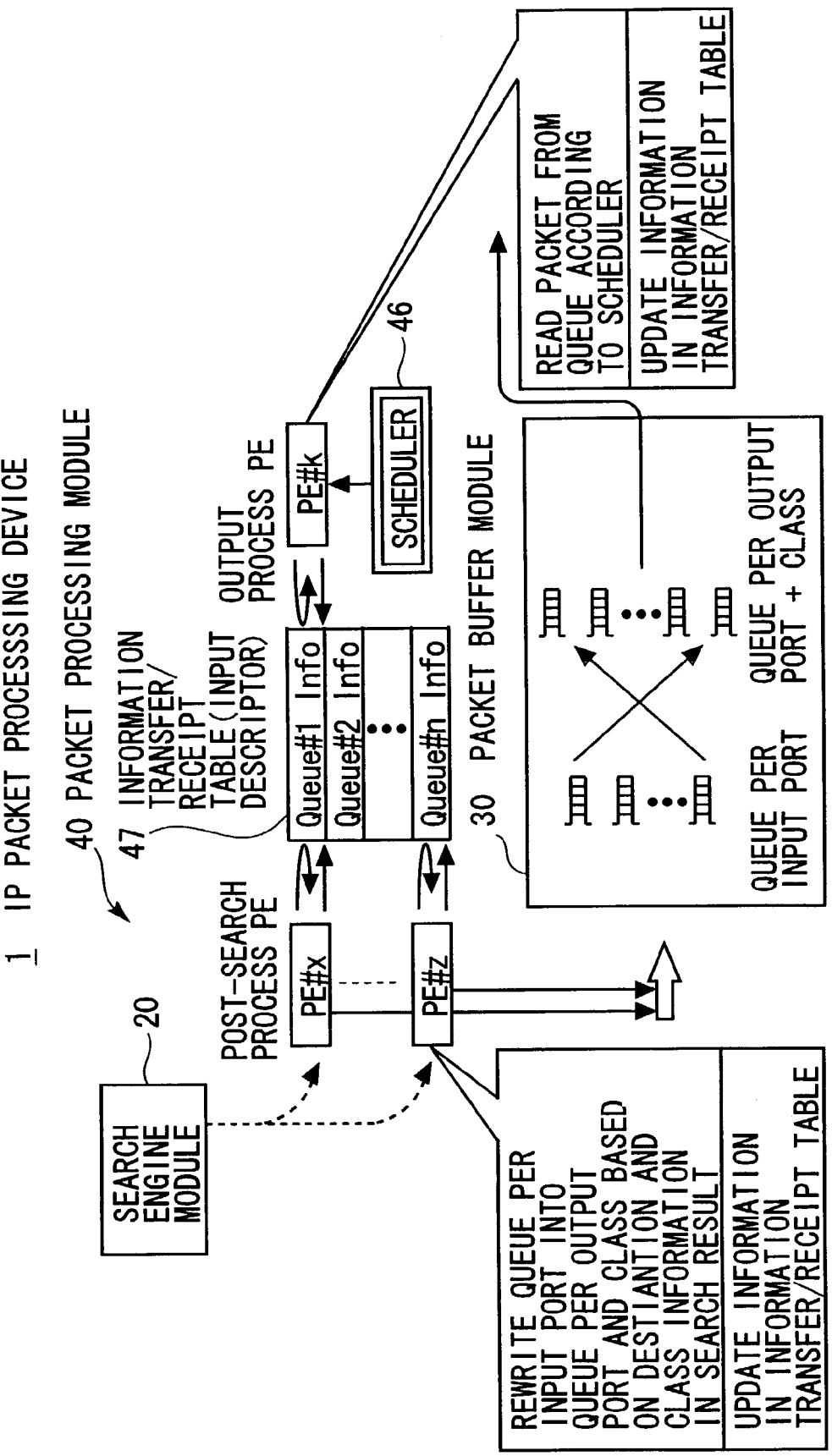
FIG. 15 is a block diagram showing an architecture of the IP packet processing device in a fourth embodiment of the present invention.
Figure 16:
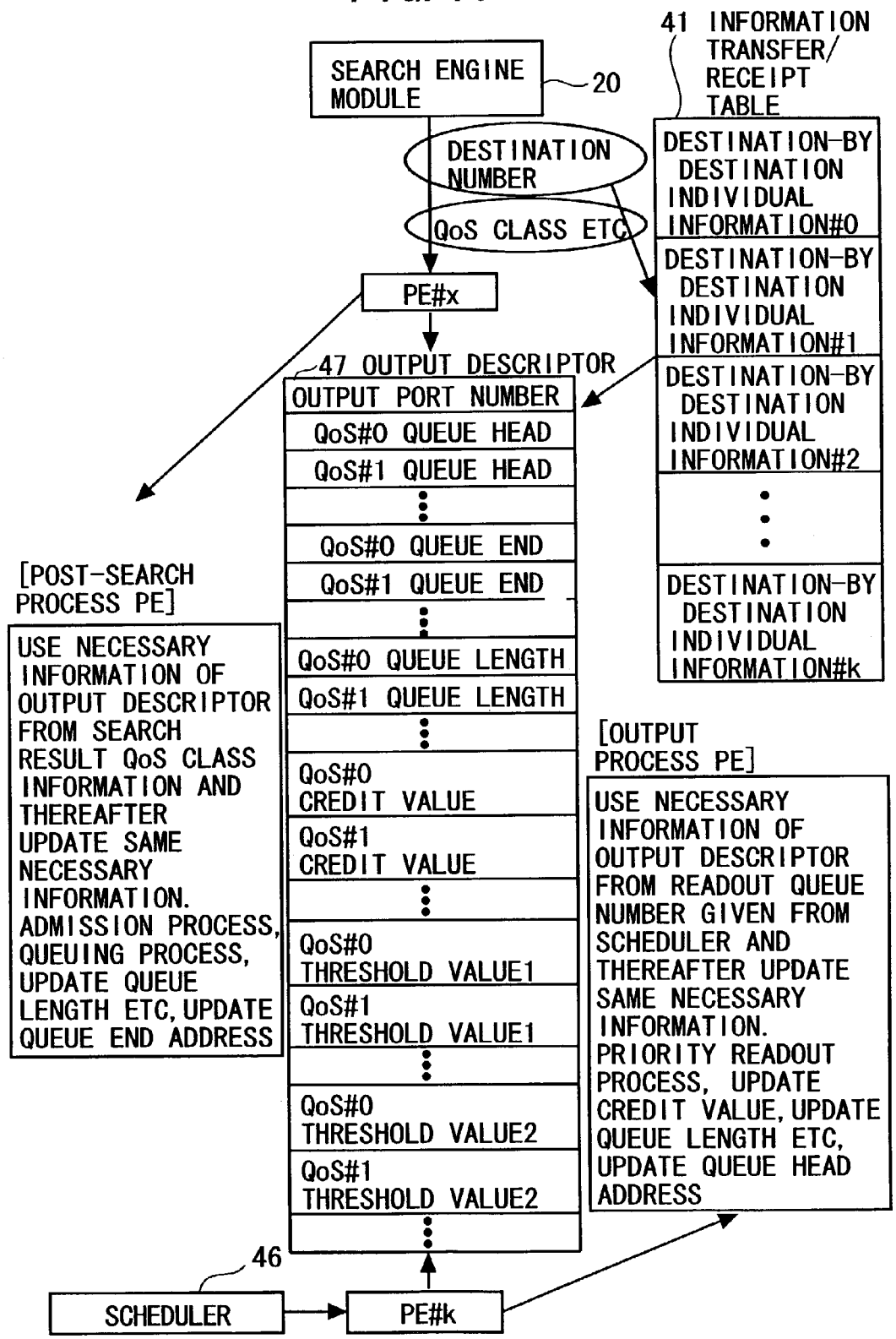
FIG. 16 is a block diagram showing an example of a structure of an output descriptor in the IP packet processing device in the fourth embodiment of the present invention.
Figure 17:
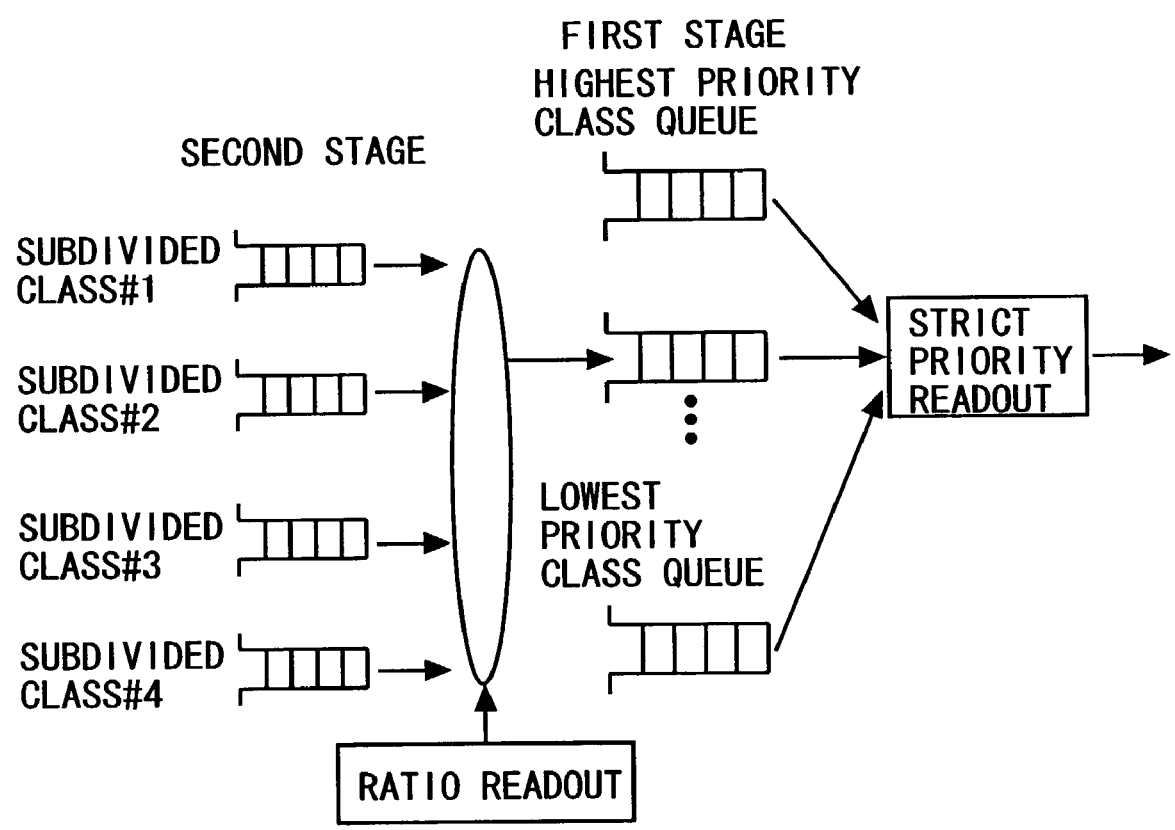
FIG. 17 is a block diagram showing an example of a queue structure in the IP packet processing device in the fourth embodiment.

Next, the IP packet processing device in a fourth embodiment of the present invention will be explained with reference to FIGS. 15, 16, 17 and 18 in combination. FIG. 15 shows an example of the architecture of the IP packet processing device in the fourth embodiment. FIG. 16 shows an example of a structure of an output descriptor 47. FIG. 17 shows an example of a queue structure per destination. FIG. 18 shows one example of a ratio reading algorithm.

In this IP packet processing device 1, the search result transferred to the post-search process processor PE of the packet processing module 40 from the search engine module 20 for the post-search process, is information containing a destination number, a QoS class etc.

The destination number indicates an index value in the data table (the information transfer/receipt table 41 and the output descriptor 47) for the queue information etc per destination. The post-search process processor PE acquires the index value (destination) from the information transfer/receipt table 41 indexed based on the destination number. The post-search process processor PE obtains the queue information per destination from the output descriptor 47 on the basis of the acquired index value, thereby executing the queuing process.

All pieces of information per destination such as a queue length, a discard threshold value, ahead address, a last address etc of each QoS class, are laid out (stored) as one cluster in the output descriptor 47. The output descriptor 47 is based on a stable structure in which all necessary items of information are obtained by one continuous access from the post-search process processor PE.

The post-search process processor PE changes the packets queued up according to every input port in the input interface module 50 into being queued upper destination class in accordance with the destination information acquired from the search result information. Information on the thus changed queue is written into the output descriptor 47.

The output process processor PE (PE#k) reads, in a way that operates absolutely independent of the post-search process processor PE, the packet from the queue concerned in request to a packet reading request given from the scheduler 46. On this occasion, the output process processor PE obtains the information about the queue concerned from the output descriptor 47, and outputs this packet. The output process processor PE, after outputting the packet, updates the queue information on the readout QoS class queue. The output descriptor 47 functions as an interface, whereby the post-search process processor PE shares the information with the output process processor PE.

Under class-to-class read priority control, an algorithm for reading the packet in accordance with a ratio specified in each class, is that the packet is read in a way that guarantees simple impartiality by mutually lending and borrowing credit values corresponding to a delimiter of a certain packet length each time the packet is read from every class, wherein the set ratio is used as an initial value of credit (which is herein a parameter of the readout ratio).

The per-destination queue structure has a two-stage structure as shown in FIG. 17. The queue takes the structure for every destination (the output port number) shown in FIG. 16. The first-stage class queue categorized under complete priority control contains a plurality of subdivided classes at the second stage, wherein the packet is read according to the preset ratios between the subdivided classes.

With this structure adopted herein, the QoS control such as the packet read priority control and the admission control can be conducted more finely.

FIG. 18 shows the ratio reading algorithm. Referring to FIG. 18, a ratio between the credit values set per QoS becomes a class-to-class reading ratio. Each credit value is specified by the factorial of 2, wherein the credit values are 1, 2, 4, 8, 16, 32, 64 and up to 128.

Each credit takes a credit initial value of each class. In the case of reading a packet from this group, a QoS packet having the largest credit value at this point of time is read.

Further, the credit values are lent and borrowed between the QoS classes on the basis of the following algorithm, thereby actualizing the guaranty of the class-to-class ratio.

There is created a scheduler in which respective weight values are arranged in series, and the weight value advances one by one each time the packet is read from the self-class (QoS Wheel).

Reading is done on a packet-by-packet basis and, when reading a new packet, the packet is read from a queue of the QoS class having the largest credit value. Note that if there exists no packet that should be read, the QoS wheel moves to the second QoS.

When reading the data, a process of updating the credit value is executed at next logic.

(1) The QoS indicated by the QoS wheel is compared with the actually read-out QoS.

(2) If judged to be the same QoS class, the credit value is not decremented.

(3) If the QoS class is different, the credit value of the actually read-out QoS is decremented by 1.

(4) The credit value of the QoS indicated by the QoS wheel is incremented by 1.

[Modified Example]

The processes in each of the embodiments discussed above can be provided as a program executable by a computer, recorded on a recording medium such as a CD-ROM, a flexible disk etc and distributed via communication lines.

Moreover, the respective processes or the architectures in the embodiments discussed above can be carried out in a way that selects an arbitrary part of the processes or the architectures in the embodiments discussed above and combines them.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A packet processing device comprising:
   a search engine module including an associative memory for transferring a packet on the basis of an entry mapping to route information;
   a first processor taking charge of a pre-search process before a process of the packet to said search engine module; and
   a second processor taking charge of a post-search process for executing a process of routing the packet on the basis of a search result of said search engine module;
   a table used for transferring and receiving information between said first processor in charge of the pre-search process and said second processor in charge of the post-search processor;
   wherein the pre-search process executed by said first processor includes a process for writing a search key extracted from the packet and identifying information into a specified field of said table, and a process for transferring the search key and the identifying information to said search engine module;
   the identifying information is transferred through said search engine module as a transparent medium; and
   the post-search process executed by said second processor includes based on the identifying information transparently passed through said search engine module, a process for acquiring storage information in the pre-search process from the specified field of said table, thereby carrying out a routing process of the packet in a way that takes into account information on a search result given from the search engine module.

2. A packet processing device according to claim 1, further comprising a module monitoring, if said table is constructed of a FIFO memory and said first processor and said second processor are plural respectively, a queue length of said FIFO memory, and dynamically changing a share number of said first processors in charge of the pre-search process and a share number of said second processors in charge of the post-search process in accordance with how much a queue stays.

3. A packet processing device according to claim 1, wherein said search engine module includes, separately from an interface for a search request from said first processor in charge of the pre-search process, a statistics request interface in order to make a unitary management of queuing statistics information from at least said first processor in charge of the pre-search process and said second processor in charge of the post-search process together with routing statistic information.

4. A packet processing device according to claim 1, further comprising a descriptor registered with all pieces of queuing information as one cluster for every destination in order to transfer and receive the information between a queuing process of writing the information in a queue for every flow and a scheduling process of reading the information from the queue.

5. A packet processing device according to claim 1, further comprising a two-stage queue structure module containing a plurality of classes existing in each flow and a plurality of subclasses further existing in one class.

6. A packet processing device according to claim 5, wherein a packet having a high priority in a complete priority readout is read with a top priority from the first-stage class in said two-stage queue structure module, credit values as readout ratios are set in the plurality of subclasses at the second stage, and the packet is read corresponding to the credit value.

7. A packet processing device according to claim 6, further comprising a reading algorithm used for mutually lending and borrowing the credit values when the reading between the plurality of subclasses is effected corresponding to the readout ratio specified in each subclass.

* * * * *